(12) United States Patent
Xiang et al.

(10) Patent No.: US 10,824,896 B2
(45) Date of Patent: Nov. 3, 2020

(54) METHOD AND SYSTEM FOR IMAGE PROCESSING

(71) Applicant: SHANGHAI UNITED IMAGING HEALTHCARE CO., LTD., Shanghai (CN)

(72) Inventors: Yu Xiang, Shanghai (CN); Yang Zhang, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 84 days.

(21) Appl. No.: 15/854,705

(22) Filed: Dec. 26, 2017

(65) Prior Publication Data

US 2018/0349724 A1 Dec. 6, 2018

Related U.S. Application Data

(63) Continuation of application No. PCT/CN2017/086539, filed on May 31, 2017.

(51) Int. Cl.
*G06K 9/00* (2006.01)
*G06K 9/32* (2006.01)
(Continued)

(52) U.S. Cl.
CPC ......... *G06K 9/3233* (2013.01); *G06K 9/6288* (2013.01); *G06T 7/0012* (2013.01); *G06T 7/11* (2017.01); *G06T 7/136* (2017.01); *G06T 7/155* (2017.01); *G06T 7/187* (2017.01); *G06K 2209/05* (2013.01); *G06T 2207/10016* (2013.01); *G06T 2207/10081* (2013.01); *G06T 2207/10088* (2013.01); *G06T 2207/10104* (2013.01); *G06T 2207/10108* (2013.01);
(Continued)

(58) Field of Classification Search
USPC .................................................. 382/128–134
See application file for complete search history.

(56) References Cited

U.S. PATENT DOCUMENTS

2004/0059214 A1   3/2004   Tomoda et al.
2007/0053566 A1*  3/2007   Kim .................... G01S 15/8977
                                                            382/128

(Continued)

FOREIGN PATENT DOCUMENTS

CN   104766340 A   7/2015
CN   104794758 A   7/2015
(Continued)

*Primary Examiner* — Alex Kok S Liew
(74) *Attorney, Agent, or Firm* — Metis IP LLC

(57) ABSTRACT

A method and system for image processing is provided. The method for image processing may include: obtaining an image data set, wherein the image data set includes a first set of volume data; and determining, by the at least one processor, a target anatomy of interest based on the first set of volume data. The determining of the target anatomy of interest may include: determining an initial anatomy of interest in the first set of volume data; and editing the initial anatomy of interest to obtain the target anatomy of interest. The target anatomy of interest may include at least one region of interest (ROI) or at least one volume of interest (VOI). The initial anatomy of interest may include at least one ROI or at least one VOI.

20 Claims, 15 Drawing Sheets

(51) Int. Cl.
  *G06T 7/00* (2017.01)
  *G06T 7/187* (2017.01)
  *G06K 9/62* (2006.01)
  *G06T 7/11* (2017.01)
  *G06T 7/136* (2017.01)
  *G06T 7/155* (2017.01)

(52) U.S. Cl.
  CPC ............... *G06T 2207/10116* (2013.01); *G06T 2207/20076* (2013.01); *G06T 2207/20104* (2013.01); *G06T 2207/20221* (2013.01); *G06T 2207/30004* (2013.01)

(56) References Cited

U.S. PATENT DOCUMENTS

| | | | |
|---|---|---|---|
| 2007/0165919 A1* | 7/2007 | Deshpande | G06T 15/08 382/128 |
| 2007/0211939 A1* | 9/2007 | Kaus | A61B 6/00 382/173 |
| 2008/0089571 A1* | 4/2008 | Kurita | A61B 8/08 382/131 |
| 2008/0123914 A1 | 5/2008 | De Bliek et al. | |
| 2009/0175527 A1 | 7/2009 | Agliozzo et al. | |
| 2010/0256495 A1 | 10/2010 | Kruecker et al. | |
| 2010/0316277 A1 | 12/2010 | Fan et al. | |
| 2012/0176406 A1 | 7/2012 | Elenbaas | |
| 2014/0286551 A1* | 9/2014 | Yoshida | G06T 19/00 382/128 |
| 2017/0084025 A1 | 3/2017 | Lyu | |
| 2017/0140530 A1 | 5/2017 | Jiang et al. | |

FOREIGN PATENT DOCUMENTS

| | | |
|---|---|---|
| CN | 105139454 A | 12/2015 |
| CN | 105342701 A | 2/2016 |
| CN | 105654490 A | 6/2016 |
| WO | 2008136007 A2 | 11/2008 |

* cited by examiner

US 10,824,896 B2

METHOD AND SYSTEM FOR IMAGE PROCESSING

CROSS-REFERENCE TO RELATED APPLICATIONS

This present application is a continuation of International Application No. PCT/CN2017/086539, filed on May 31, 2017, the contents of which are hereby incorporated by reference.

TECHNICAL FIELD

The present disclosure generally relates to a method and a system for image processing, and more particularly, relates to a method and a system for processing an anatomy of interest (including a two-dimensional region of interest (also referred to as 2D ROI) and/or a three-dimensional volume of interest (also referred to as 3D VOI)) of a medical image.

BACKGROUND

Medical image post-processing software may provide one or more tools for processing an anatomy of interest (e.g., a two-dimensional region of interest (2D ROI) and/or a three-dimensional volume of interest (3D VOI)), and analyzing and/or displaying feature information (e.g., statistical feature information) of the 2D ROI and/or 3D VOI. It may be desirable to provide two functions: (1) one or more 2D ROIs and/or one or more 3D VOIs with the same size and/or the same shape may be determined at the same 2D location of different data layers of a set of volume data, and the determined 2D ROIs and/or 3D VOIs may be analyzed; (2) one or more 2D ROIs and/or one or more 3D VOIs with the same size and/or the same shape may be determined at the same 3D location of a plurality of sets of volume data, and the determined 2D ROIs and/or 3D VOIs may be analyzed. However, it may be time consuming to determine a 2D ROI and/or a 3D VOI, and it may be hard to determine manually two or more 2D ROI and/or 3D VOIs with the same location, shape, and/or size in different data layers and/or different sets of volume data.

Besides, most 2D ROI/3D VOI processing tools may have one or more shortcomings. For example, a determined 2D ROI/3D VOI may be generally a connected region, and if a local region within the connected region is not an anatomy of interest and is not to be analyzed, the traditional 2D ROI/3D VOI processing tools may not remove the local region. As another example, each 2D ROI/3D VOI may have corresponding statistical feature information, but the overall statistical feature information associated with a plurality of 2D ROIs/3D VOIs may not be obtained and/or displayed using the traditional 2D ROI/3D VOI processing tools. The present disclosure provides a method and system for positioning, transmitting, editing, and/or combining one or more 2D ROIs/3D VOIs to overcome the shortcomings mentioned above and meet various needs in practical use. Therefore, the workflow of the 2D ROI/3D VOI processing tools may be simplified, diversified functions of the 2D ROI/3D VOI processing tools may be provided, and the work efficiency of the user of the 2D ROI/3D VOI processing tools may be improved by using the methods and systems described in the present disclosure.

SUMMARY

In one aspect of the present disclosure, a first image processing method is provided. The first image processing method may be implemented on at least one machine, each of which has at least one processor and storage for image processing. The first image processing method may include: obtaining an image data set, wherein the image data set may include a first set of volume data including at least one data layer including at least one voxel; determining, by the at least one processor, a target anatomy of interest based on the first set of volume data, wherein the target anatomy of interest may include the at least one voxel in the at least one data layer, and wherein determining the target anatomy of interest may further include: determining an initial anatomy of interest in the first set of volume data, and the initial anatomy of interest may include at least one region of interest (ROI) or at least one volume of interest (VOI); and editing the initial anatomy of interest to obtain the target anatomy of interest.

In another aspect of the present disclosure, a second image processing method is provided. The second image processing method may be implemented on at least one machine, each of which has at least one processor and storage for image processing. The second image processing method may include: obtaining an image data set, wherein the image data set may include a first set of volume data including at least one data layer including at least one voxel; obtaining an initial anatomy of interest based on the first set of volume data, wherein the initial anatomy of interest may include at least one two-dimensional (2D) region of interest (ROI) or at least one three-dimensional (3D) volume of interest (VOI); determining, by the at least one processor, location information of the initial anatomy of interest; and transmitting the initial anatomy of interest in the first set of volume data or to a second set of volume data based on the location information.

In still another aspect of the present disclosure, a third image processing method is provided. The third image processing method may be implemented on at least one machine, each of which has at least one processor and storage for image processing. The third image processing method may include: obtaining an image data set; obtaining an initial anatomy of interest based on the image data set, wherein the initial anatomy of interest may include at least one two-dimensional (2D) region of interest (ROI) or at least one three-dimensional (3D) volume of interest (VOI); obtaining a candidate anatomy of interest to be combined based on the image data set, wherein the candidate anatomy of interest may include a 2D ROI related to the at least one 2D ROI or a 3D VOI related to the at least one 3D VOI; generating, by the at least one processor, a combined anatomy of interest by combining the initial anatomy of interest and the candidate anatomy of interest; and analyzing feature information of the combined anatomy of interest.

In still another aspect of the present disclosure, a first non-transitory computer readable medium is provided. The first non-transitory computer readable medium may include executable instructions. The executable instruction may be executed by at least one processor, and cause the at least one processor to effectuate the first image processing method.

In still another aspect of the present disclosure, a second non-transitory computer readable medium is provided. The second non-transitory computer readable medium may include executable instructions. The executable instruction may be executed by at least one processor, and cause the at least one processor to effectuate the second image processing method.

In still another aspect of the present disclosure, a third non-transitory computer readable medium is provided. The third non-transitory computer readable medium may include executable instructions. The executable instruction may be executed by at least one processor, and cause the at least one processor to effectuate the third image processing method.

In still another aspect of the present disclosure, a first system is provided. The first system may include: at least one processor; and a storage configured to store instructions, the instructions, when executed by the at least one processor, causing the system to effectuate the first image processing method.

In still another aspect of the present disclosure, a second system is provided. The second system may include: at least one processor; and a storage configured to store instructions, the instructions, when executed by the at least one processor, causing the system to effectuate the second image processing method.

In still another aspect of the present disclosure, a third system is provided. The third system may include: at least one processor; and a storage configured to store instructions, the instructions, when executed by the at least one processor, causing the system to effectuate the third image processing method.

In some embodiments, the editing the initial anatomy of interest to obtain the target anatomy of interest may include: determining a candidate anatomy of interest to be removed in the first set of volume data; and obtaining the target anatomy of interest by removing an overlapping area of the candidate anatomy of interest and the initial anatomy of interest from the initial anatomy of interest.

In some embodiments, the first image processing method may further include: determining whether to continue editing the target anatomy of interest; and determining an anatomy of interest which needs to be edited in the first set of volume data based on the determination that the editing of the target anatomy of interest is to be continued.

In some embodiments, the first image processing method may further include transmitting the target anatomy of interest in the first set of volume data including: determining location information of the target anatomy of interest, wherein the location information of the target anatomy of interest may include a three-dimensional coordinate location of a voxel of the target anatomy of interest in the first set of volume data; obtaining a first transmitting depth in a first transmitting direction, wherein the first transmitting direction may have a first angle with respect to a plane of a first data layer in the first set of volume data; obtaining a second transmitting depth in a second transmitting direction, wherein the second transmitting direction may have a second angle with respect to the plane of the first data layer in the first set of volume data; determining at least one second data layer of the first set of volume data based on the first transmitting depth and the second transmitting depth; and generating a transmitted anatomy of interest in the at least one second data layer based on the location information of the target anatomy of interest.

In some embodiments, the first image processing method may further include transmitting the target anatomy of interest to a second set of volume data including: obtaining the second set of volume data; determining location information of the target anatomy of interest, wherein the location information of the target anatomy of interest may include a three-dimensional coordinate location of a voxel of the target anatomy of interest in the first set of volume data; and generating a transmitted anatomy of interest in the second set of volume data based on the location information of the target anatomy of interest.

In some embodiments, the first image processing method may further include: obtaining a candidate anatomy of interest to be combined in the first set of volume data; and combining the target anatomy of interest and the candidate anatomy of interest.

In some embodiments, the first image processing method may further include: transmitting the initial anatomy of interest in the first set of volume data or to a second set of volume data.

In some embodiments, determining an initial anatomy of interest may include: determining a deriving anatomy of interest in the first set of volume data; determining location information of the deriving anatomy of interest, wherein the location information of the deriving anatomy of interest may include a three-dimensional coordinate location of a voxel of the deriving anatomy of interest in the first set of volume data; and generating the initial anatomy of interest by transmitting the deriving anatomy of interest in the first set of volume data based on the location information of the deriving anatomy of interest.

In some embodiments, determining an initial anatomy of interest may include: obtaining a third set of volume data; determining a deriving anatomy of interest in the third set of volume data; determining location information of the deriving anatomy of interest, wherein the location information of the deriving anatomy of interest may include a three-dimensional coordinate location of a voxel of the deriving anatomy of interest in the third set of volume data; and generating the initial anatomy of interest by transmitting the deriving anatomy of interest to the first set of volume data based on the location information of the deriving anatomy of interest.

In some embodiments, determining an initial anatomy of interest may include: determining at least two deriving anatomies of interest in the first set of volume data; and generating the initial anatomy of interest by combining the at least two deriving anatomies of interest.

In some embodiments, the first image processing may further include analyzing the target anatomy of interest, wherein analyzing the target anatomy of interest may include: analyzing feature information associated with the target anatomy of interest, wherein the feature information may include statistical feature information obtained based on statistical analysis of a plurality of voxels in the target anatomy of interest.

In some embodiments, transmitting the initial anatomy of interest in the first set of volume data may include: obtaining a first transmitting depth in a first transmitting direction, wherein the first transmitting direction may have a first angle with respect to a plane of a first data layer in the first set of volume data; obtaining a second transmitting depth in a second transmitting direction, wherein the second transmitting direction may have a second angle with respect to the plane of the first data layer in the first set of volume data; determining at least one second data layer of the first set of volume data based on the first transmitting depth and the second transmitting depth; determining location information of the initial anatomy of interest, wherein the location information of the initial anatomy of interest may include a three-dimensional coordinate location of a voxel of the initial anatomy of interest in the first set of volume data; and generating a transmitted target anatomy of interest in the at least one second data layer based on the location information of the initial anatomy of interest.

In some embodiments, the second image processing method may further include: determining a candidate anatomy of interest to be combined in the first set of volume data; and combing the target anatomy of interest and the candidate anatomy of interest.

In some embodiments, transmitting the initial anatomy of interest to a second set of volume data may include: obtaining the second set of volume data; determining location information of the initial anatomy of interest, wherein the location information of the initial anatomy of interest may include a three-dimensional coordinate location of a voxel of the initial anatomy of interest in the first set of volume data; and generating a transmitted anatomy of interest in the second set of volume data based on the location information.

In some embodiments, the second image processing method may further include: determining a candidate anatomy of interest to be combined in the second set of volume data; and combining the transmitted anatomy of interest and the candidate anatomy of interest.

In some embodiments, the second image processing method may further include: determining a candidate anatomy of interest to be combined in the first set of volume data; and combining the initial anatomy of interest and the candidate anatomy of interest.

In some embodiments, obtaining the initial anatomy of interest in the first set of volume data may include: determining at least two deriving anatomies of interest in the first set of volume data; and generating the initial anatomy of interest by combining the at least two deriving anatomies of interest.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
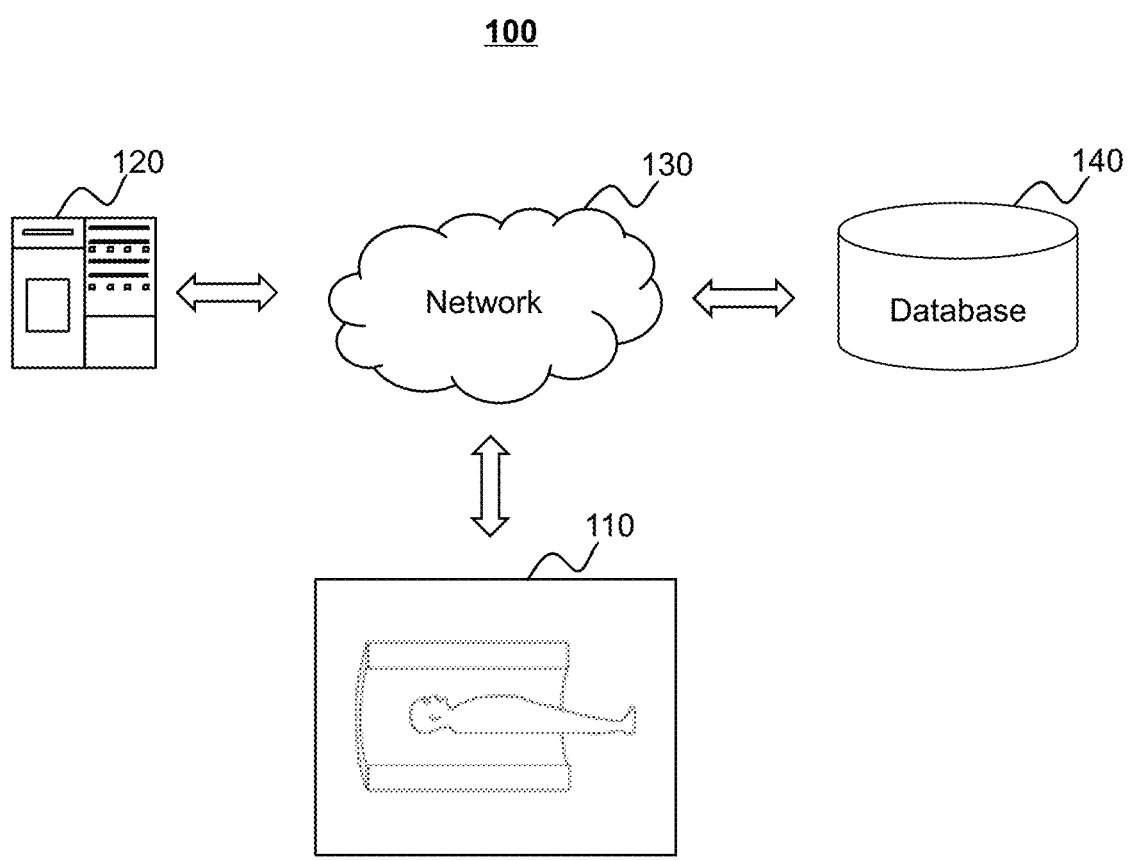
FIG. 1 is a schematic diagram illustrating an exemplary image processing system according to some embodiments of the present disclosure.

In order to illustrate the technical solutions related to the embodiments of the present disclosure more clearly, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As described in the specification and claims, the singular forms "a," "an," and "the" may be intended to include the plural forms as well, unless the context clearly indicates otherwise. It will be further understood that the terms "comprises," "comprising," "includes," and/or "including" when used in this disclosure, specify the presence of stated steps and elements, but do not preclude the presence or addition of one or more other steps and elements.

Some modules of the system may be referred to in various ways according to some embodiments of the present disclosure, however, any number of different modules may be used and operated in an electric control equipment. These modules are intended to be illustrative, not intended to limit the scope of the present disclosure. Different modules may be used in different aspects of the system and method.

It should be noted that an anatomy of interest in the present disclosure may refer to a two-dimensional (2D) region of interest (ROI) or a three-dimensional (3D) volume of interest (VOI) in one or more data layers, while a VOI may refer to a volume of interest (e.g., VOI may be a three-dimensional ROI) in two or more data layers. A two-dimensional (2D) ROI in the present disclosure may refer to an ROI in a data layer. An anatomy of interest (e.g., a 2D ROI or a 3D VOI) may be used in the image processing operations in the present disclosure. In some embodiments, an anatomy of interest may include a 2D ROI and/or a 3D VOI.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart. It should be noted that the terms "first," "second," "third," "fourth," "fifth," "sixth," "seventh," "eighth," etc. are only for ease of description and do not represent a particular order or name.

FIG. 1 is a schematic diagram illustrating an exemplary image processing system 100 according to some embodiments of the present disclosure. The image processing system 100 may include an imaging device 110, a processing device 120, a network 130, and a storage device 140. In some embodiments, the imaging device 110 may be a single-modality imaging device or a multi-modality imaging device. In some embodiments, the processing device 120 may process and/or analyze information obtained from other components (e.g., the imaging device 110, the storage device 140, and/or the network 130) of the image processing system 100, and/or output a processed result.

The imaging device 110 may include a single imaging device, or a combination of a plurality of different imaging devices. The imaging device 110 may perform imaging by scanning a subject. In the present disclosure, "subject" and "object" are used interchangeably. In some embodiments, the imaging device 110 may be a medical imaging device. The medical imaging device may collect image information of one or more parts of a human body. In some embodiments, the imaging device 110 may be a positron emission tomography (PET) system, a single photon emission computed tomography (SPECT) system, a computed tomography (CT) system, a magnetic resonance imaging (MRI) system, a digital radiography (DR) system, a computed tomography colonography (CTC) system, or the like, or a combination thereof. The imaging device 110 may include one or more scanners. The scanners may be a digital subtraction angiography (DSA) scanner, a magnetic resonance angiography (MRA) scanner, a computed tomography angiography (CTA) scanner, a positron emission tomography (PET) scanner, a single photon emission computed tomography (SPECT) scanner, a computed tomography (CT) scanner, a magnetic resonance imaging (MRI) scanner, a digital radiography (DR) scanner, a multi-modality scanner, or the like, or a combination thereof. In some embodiments, the multi-modality scanner may be a computed tomography-positron emission tomography (CT-PET) scanner, a single photon emission computed tomography-magnetic resonance imaging (SPECT-MRI) scanner, a positron emission tomography-magnetic resonance imaging (PET-MRI) scanner, a digital subtraction angiography-magnetic resonance imaging (DSA-MRI) scanner, or the like.

The processing device 120 may process data or information. The processing device 120 may perform data processing such as denoising, image artifact removing, image segmentation, image rendering, image registration, image fusion, image reconstruction, etc. In some embodiments, the processing device 120 may perform operations such as determining and/or editing a 2D ROI or a 3D VOI in an image. In some embodiments, the data or information processed may include text information, image information, sound information, video information, or the like, or a combination thereof. In some embodiments, the processing device 120 may include a processing engine, a processing core, one or more storage, or the like, or a combination thereof. For example, the processing device 120 may include a Central Processing Unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a processor, a microprocessor, an advanced RISC machines (ARM) processor, or the like, or a combination thereof. In some embodiments, the processing device 120 may process image information obtained from the imaging device 110. In some embodiments, the processing device 120 may process image information obtained from the storage device 140 or other storage device. One or more processing results generated by the processing device 120 may be stored in an internal storage (e.g., the storage device 140) of the image processing system 100 or other external data sources (not shown) via the network 130.

In some embodiments, the processing device 120 may receive a user instruction directly, and perform one or more operations related to image processing. In some embodiments, a user may use a remote terminal (not shown) to access the processing device 120 via the network 130. The processing results generated by the processing device 120 may be presented to the user directly or sent to the remote terminal via the network 130 for displaying for the user.

The network 130 may be a single network or a combination of different networks. For example, the network 130 may be a local area network (LAN), a wide area network (WAN), a public network, a private network, a proprietary network, a public switched telephone network (PSTN), an Internet, a wireless network, a virtual network, a metropolitan area network, a telephone network, or the like, or a combination thereof. The network 130 may include various network access points, for example, wired or wireless access points including a wired access point, a wireless access point, a base station, an Internet switching point, etc. The processing device 120 and/or the imaging device 110 may access network 130 through these access points and send and/or receive data information via the network 130. For the purposes of illustration, the imaging device 110 in the field of medical image is illustrated as an example, and the present disclosure is not limited to the scope of the embodiment. For example, the imaging device 110 may be a CT system or an MRI system, and the network 130 of the image processing system 100 may include wireless networks (Bluetooth, wireless local area network (e.g., WLAN, Wi-Fi, WiMax, etc.), a mobile network (e.g., 2G signal, 3G signal, 4G signal, etc.), or other networks (e.g., a Virtual Private Network (VPN), a shared network, a near field communication (NFC), ZigBee, etc.). In some embodiments, the network 130 may be used for the image processing system 100 to receive information from one or more components inside or outside of the image processing system 100, and to send information to one or more other components inside or outside of the image processing system 100. In some embodiments, the imaging device 110, the processing device 120, and the storage device 140 may be connected to the network 130 by a wired connection, a wireless connection, or a combination thereof.

The storage device 140 may store information. The storage device 140 may be a local storage device, or a remote storage device. In some embodiments, the storage device 140 or other storage device in the image processing system 100 may store various information (e.g., the image data). In some embodiments, the storage device 140 or other storage device in the system may be a medium with a read/write function. The storage device 140 or other storage device in the system may be a device within the system, or an external device of the system. The storage device 140 may be connected with other storage device in the system by a wired connection or a wireless connection. The storage device 140 or other storage device in the system may include a hierarchical database, a network database, a relational database, or the like, or a combination thereof. The storage device 140 or other storage device in the system may digitize information and/or store the digitized information using an electronic device, a magnetic device, or an optical storage device.

The storage device 140 or other storage device in the system may be a device that stores information by electricity, such as a random access memory (RAM), a read only memory (ROM), or a combination thereof. The RAM may include a decimal count tube, a selectron tube, a delay line memory, a Williams tube, a dynamic random access memory (DRAM), a static random access memory (SRAM), a thyristor random access memory (T-RAM), a zero-capacitor random access memory (Z-RAM), or the like, or a combination thereof. The ROM may include a magnetic bubble memory, a magnetic twistor memory, a thin-film memory, a magnetic plated wire memory, a magnetic core memory, a magnetic drum memory, an optical disc drive, a hard disk, a tape, a phase change memory, a flash memory, an electrically erasable programmable read-only memory, an erasable programmable read-only memory, a programmable read-only memory, a mask ROM, a racetrack memory, a resistive random access memory, a programmable metallization cell, or the like, or a combination thereof. The storage device 140 or other storage device in the system may be a device that stores information by magnetic energy, such as a hard disk, a floppy disk, a tape, a magnetic core memory, a magnetic bubble memory, a USB flash disk, and a flash memory. The storage device 140 or other storage device in the system may be a device that stores information by optical energy, such as a CD or a DVD. The storage device 140 or other storage device in the system may be a device that stores information by means of magneto-optical manners, such as a magneto-optical disk. The storage device 140 or other storage device in the system may be a random storage, a serial access storage, a read-only storage, or the like, or a combination thereof. The storage device 140 or other storage device in the system may be a non-permanent memory or a permanent memory. It should be noted that the above description of storage devices is provided for the purpose of illustration, and not intended to limit the scope of the present disclosure.

In some embodiments, the storage device 140 may be a part of the imaging device 110 and/or the processing device 120. In some embodiments, the storage device 140 may be independently and directly connected to the network 130. In some embodiments, the storage device 140 may store data collected from the imaging device 110, the processing device 120, and/or the network 130. In some embodiments, the storage device 140 may store various data used, generated, and/or outputted by the processing device 120. In some embodiments, the connection or communication of the storage device 140 with the imaging device 110, the processing device 120, and/or the network 130 may be in a wired mode, a wireless mode, or a combination thereof. In some embodiments, the imaging device 110 may access the storage device 140 and/or the processing device 120, or the like, directly or via the network 130.

It should be noted that the processing device 120 and/or the storage device 140 may be configured in the imaging device 110 or perform one or more corresponding functions through a cloud computing platform. The cloud computing platform may include a storing cloud platform mainly for storing data, a computing cloud platform mainly for processing data, and an integrated cloud computing platform for storing and processing data. The cloud platform used by the imaging device 110 may be a public cloud, a private cloud, a community cloud, or a hybrid cloud, or the like. For example, image information and/or data outputted by the imaging device 110 may be computed and/or stored through a user cloud platform, and may be computed and/or stored through a local processing device and/or storage device.

It should be noted that the above description of the image processing system 100 is provided for the purpose of illustration, and not intended to limit the scope of the present disclosure. For persons having ordinary skills in the art, modules may be combined in various ways, or connected with other modules as sub-systems. Various variations and modifications may be conducted under the teaching of the present disclosure. However, those modifications and changes are still within the scope of the present disclosure. For example, the storage device 140 may be a cloud computing platform with a data storage function, including a public cloud, a private cloud, a community cloud, a hybrid cloud, or the like. Such modifications are within the scope of the present disclosure.

Figure 2:
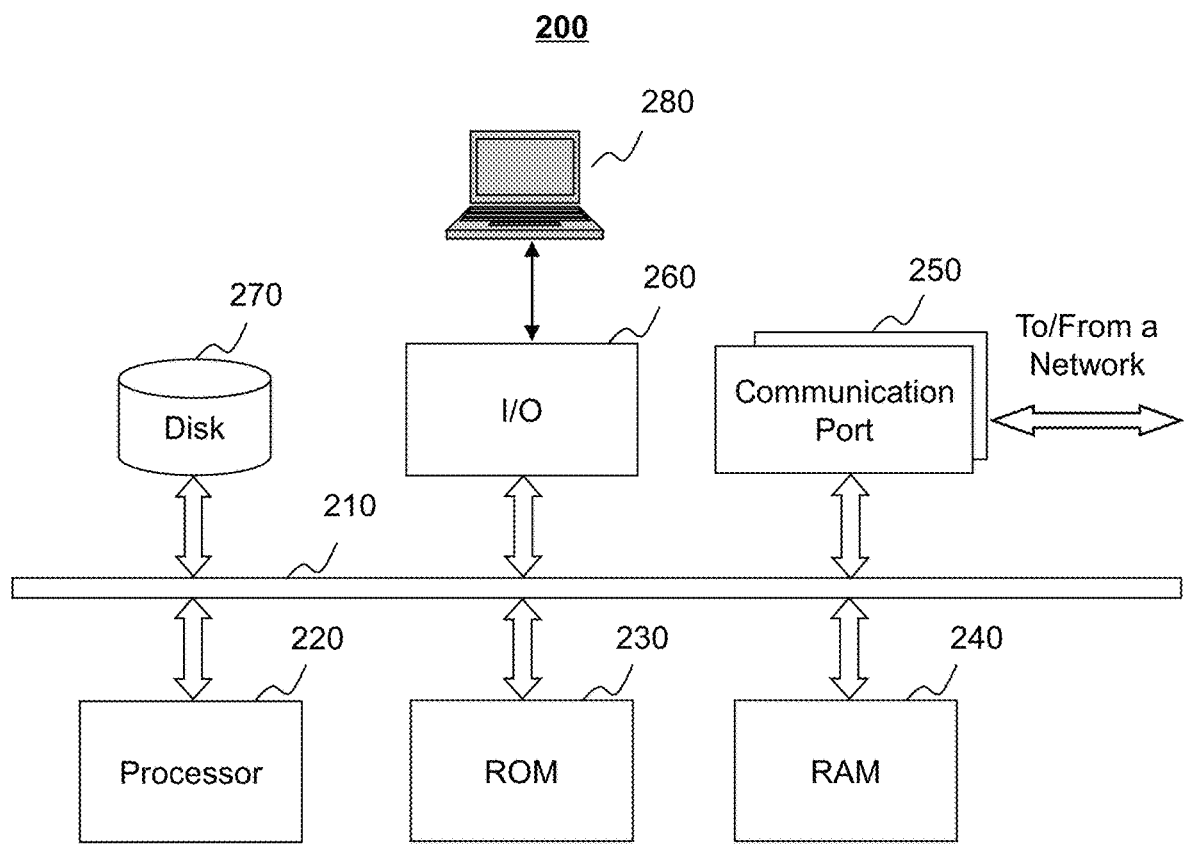
FIG. 2 is a schematic diagram illustrating exemplary hardware and/or software components of an exemplary computing device on which the processing device may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. The computing device 200 may achieve and/or implement a system disclosed in the present disclosure. The computing device 200 may implement one or more components, modules, units, subunits of the processing device 120. In addition, the processing device 120 can be implemented by the computing device 200 through hardware devices, software programs, firmware, or a combination thereof. The computing device 200 may be a general purpose computer or a particular purpose computer. Both computers may be used to implement the system in the present disclosure. Although only one such computer is shown in FIG. 2, for convenience, the computer functions relating to image processing as described herein may be implemented in a distributed computing platform including a plurality of similar computing devices to distribute the processing load.

As shown in FIG. 2, the computing device 200 may include a intercommunication bus 210, a processor 220, a read-only memory (ROM) 230, a random access memory (RAM) 240, a communication port 250, an input/output component 260, a disk 270, and/or a user interface 280. The intercommunication bus 210 may implement data communication among components of the computing device 200. The processor 220 may be used to execute program instructions to accomplish functions, components, modules, units, subunits of the processing device 120 disclosed in the present disclosure. The processor 220 may include one or more processors. The communication port 250 may implement data communication (for example, via the network 130) of the computing device 200 with other parts (e.g., the imaging device 110 and the processing device 120) of the image processing system 100. The computing device 200 may also include different program storage units and data storage units, such as the disk 270, the read-only memory (ROM) 230, the random access memory (RAM) 240, which can be used to store various data used in computer processing and/or communication, and program instructions that may be executed by the processor 220. The input/output component 260 may support data transmission between the components (e.g., the user interface 280) of the computing device 200 and/or other components of the image processing system 100 (e.g., the storage device 140). The computing device 200 may also send and/or receive data via the network 130 through the communication port 250.

Figure 3:
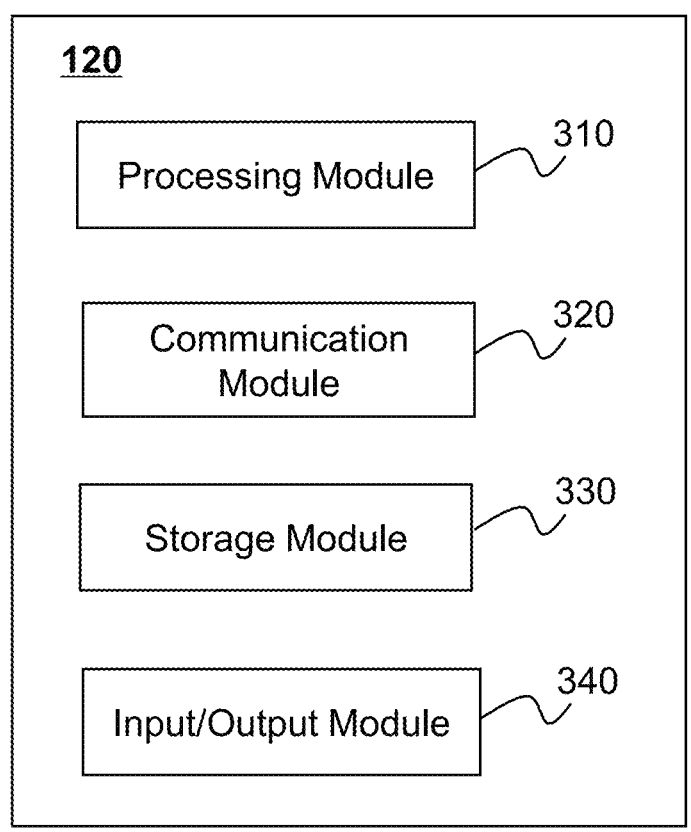
FIG. 3 is a block diagram illustrating an exemplary processing device according to some embodiments of the present disclosure.

FIG. 3 is a block diagram illustrating an exemplary processing device according to some embodiments of the present disclosure. The processing device 120 in the processing device 120 may include a processing module 310, a communication module 320, and a storage module 330. The processing device 120 may further include an input/output module 340. The input/output module 340 may receive image data generated by the imaging device 110 and/or send the image data to the processing module 310, or the like. The input/output module 340 may send the processed image data generated by the processing module 310 via the network 130 to a component (e.g., the imaging device 110, the storage device 140, etc.) connected with the processing device 120. The connection between the modules in the processing device 120 may be a wired connection, a wireless connection, and/or a combination thereof. Each module in the processing device 120 may be a local module, a remote module, and/or a combination thereof. The connection between the modules in the processing device 120 may be a one-to-one connection, a one-to-many connection, or a many-to-many connection. For example, the processing device 120 may include a processing module 310 and a communication module 320. As another example, the processing device 120 may include a plurality of processing modules 310 and a plurality of storage modules 330. The plurality of processing modules 310 may correspond to the plurality of storage modules 330 respectively, and process image data obtained from a corresponding storage module 330 separately. The image data may include one or more images (e.g., a 2D image, a 3D image, etc.) and/or one or more regions thereof, video data (e.g., one or more videos, video frames, and other data related to the videos), data used to process images and/or videos (e.g., data used to compress or decompress, encrypt or decrypt, send or receive, and display images and/or videos), data related to images, etc.

The input/output module 340 may receive information from other modules in the image processing system 100 or one or more external modules. The input/output module 340 may send information to other modules in the image processing system 100 or the external modules. In some embodiments, the input/output module 340 may receive image data generated by the imaging device 110. The image data may include a computer tomographic image data, an X-ray image data, a magnetic resonance image data, an ultrasonic image data, a thermal image data, a nuclear image data, a ray image data, etc. In some embodiments, information received by the input/output module 340 may be processed by the processing module 310 and/or stored in the storage module 330. In some embodiments, the input/output module 340 may output image data processed by the processing module 310. In some embodiments, information received and/or outputted by the input/output module 340 may be in a format of digital imaging and communications in medicine (DICOM). The data in the format of DICOM may be transmitted and/or stored based on one or more criteria. In some embodiments, the input/output module 340 may perform corresponding operations through the input/output component 260 of the computing device 200.

The processing module 310 may process image data. In some embodiments, the processing module 310 may obtain image data from the imaging device 110 and/or storage device 140 through the input/output module 340. In some embodiments, the processing module 310 may obtain image data from the storage module 330 directly. In some embodiments, the processing module 310 may process the obtained image data. The processing of the image data may include an image digitization, an image compression (e.g., image encoding), an image enhancement and recovery (e.g., image enhancement, image recovery, image reconstruction), an image analysis (e.g., image segmentation, image matching, image recognition), or the like, or a combination thereof. In some embodiments, the processing module 310 may process medical image data. The processing of the medical image data may include volume rendering (e.g., volume ray casting, early ray termination, 2D ROI/3D VOI determination (e.g., determining a 2D ROI/3D VOI, editing a 2D ROI/3D VOI, transmitting a 2D ROI/3D VOI, combining 2D ROIs/3D VOIs)), an image compression (e.g., image encoding (e.g., model-based coding, neural network-based coding)), an image analysis (e.g., image segmentation (e.g., region segmentation (e.g., region growing, region splitting and combining, octree), threshold segmentation, edge segmentation, histogram method, etc.)), an image enhancement and recovery (e.g., filtering (e.g., high-pass filtering, low-pass filtering, band-pass filtering), a Fourier transformation, a pseudo-color enhanced image reconstruction (e.g., texture mapping), an image coloring (e.g., radiation coloring), an image rendering (e.g., ray tracing, photon mapping, 3D rendering), an image edge fusion (e.g., grayscale-based window correlation matching)), a fitting, an interpolating, a scattering, or the like, or a combination thereof. For example, in medical image processing, a 2D ROI/3D VOI may be determined in an image and feature information (e.g., statistical feature information) of the 2D ROI/3D VOI may be analyzed. The statistical feature information may include a variance, an area, a length, an average value, a maximum value, a minimum value, a volume, a frequency distribution, a histogram, or the like. In some embodiments, the processing module 310 may perform corresponding operations through the processor 220.

In some embodiments, the processing module 310 may include one or more processing units or devices such as a central processing unit (CPU), a graphics processing unit (GPU), a digital signal processor (DSP), a system on a chip (SoC), a microcontroller unit (MCU), or a combination thereof. In some embodiments, the processing module 310 may include a processing unit with a specific function. For example, the processing module 310 may include a processing unit for determining a 2D ROI/3D VOI in an image. As another example, the processing module 310 may include a processing unit with a user-defined function.

The communication module 320 may realize communication between the processing device 120 and the network 130. The communication mode of the communication module 320 may include a wired communication and/or a wireless communication. The wired communication may be realized through a transmission medium such as a wire, a cable, an optical cable, a waveguide, nanomaterials, etc. The wireless communication may include IEEE 802.11 series wireless communication, IEEE 802.15 series wireless communication (e.g., Bluetooth, ZigBee, etc.), a mobile communication (e.g., TDMA, CDMA, WCDMA, TD-SCDMA, TD-LTE, FDD-LTE, etc.), a satellite communication, a microwave communication, a scatter communication, an atmospheric laser communication, or the like, or a combination thereof. In some embodiments, the communication module 320 may encode the transmitted information using one or more encoding modes. The encoding modes may include a phase encoding, a non-return-to-zero encoding, a differential Manchester encoding, or the like, or a combination thereof. In some embodiments, the communication module 320 may select the encoding and/or transmitting mode based on an image type. For example, the communication module 320 may perform encoding and transmitting based on the DICOM criteria when the image data is in DICOM format. In some embodiments, the communication module 320 may perform corresponding operations through the communication port 250 of the computing device 200.

The storage module 330 may store information. The information may include image data obtained by the input/output module 340 and/or processed results generated by the processing module 310, etc. The information may include texts, numbers, sounds, images, videos, or the like, or a combination thereof. In some embodiments, the storage module 330 may include various storage devices such as a solid state disk, a hard disk drive, a USB flash memory, an SD memory card, a CD, a random access memory (RAM), a read-only memory (ROM), or a combination thereof. In some embodiments, the storage module 330 may be a local storage of the processing device 120, an external storage of the processing device 120, and/or a storage (e.g., cloud storage) connected with the processing device 120 via the network 130, etc. In some embodiments, the storage module 330 may include a data management unit (not shown). The data management unit may monitor and manage data in the storage module, and delete data with no utilization or low utilization, so that the storage module 330 may maintain a sufficient storage capacity. In some embodiments, the storage module 330 may perform corresponding operations through the ROM 230, the RAM 240, and/or other storage devices of the computing device 200.

It should be noted that the above description of the processing device 120 is provided for the purpose of illustration, and not intended to limit the scope of the present disclosure. For persons having ordinary skills in the art, modules may be combined in various ways or connected with other modules as sub-systems. Various variations and modifications may be conducted under the teaching of the present disclosure. However, those variations and modifications may not depart from the spirit and scope of this disclosure. In some embodiments, the processing device 120 may include a control module. The control module may control the receiving, processing, storing, inputting, and/or outputting of image data, or the like, in the processing device 120. For example, the control module may control the input/output module 340 to obtain information (e.g., obtain a user instruction, an expert opinion, etc. from the user interface 280), or transmit information (e.g., share patient information in a healthcare system) to the network 130.

Figure 4:
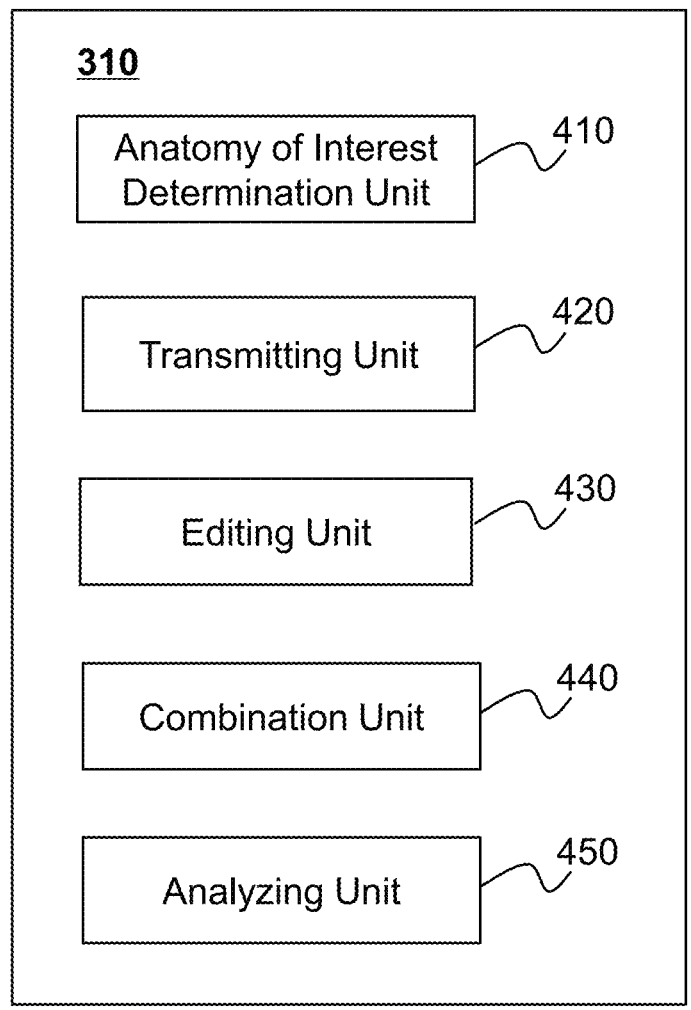
FIG. 4 is a block diagram illustrating an exemplary processing module according to some embodiments of the present disclosure.

FIG. 4 is a block diagram illustrating an exemplary processing module according to some embodiments of the present disclosure. The processing module 310 may include an anatomy of interest determination unit 410, a transmitting unit 420, an editing unit 430, a combination unit 440, and an analyzing unit 450. It should be noted that the above description of the processing module 310 of the processing device 120 is provided for the purpose of illustration, and not intended to limit the scope of the present disclosure. In some embodiments, the processing module 310 may also include one or more other units. In some embodiments, one or more units mentioned above may be unnecessary. In some embodiments, two or more units mentioned above may be combined into one unit. In some embodiments, the units mentioned above may be independent. The independence of the units may refer to that each unit performs its own functions separately. In some embodiments, the units mentioned above may be interconnected. The interconnection of the units may refer to that data in each unit may be used crosswise.

In some embodiments, the data processed by the processing module 310 may be an image or a part thereof. The image may be a 2D image and/or a 3D image. In some embodiments, a 3D image may also be seen as a series of 2D slices or 2D image layers. In a 2D image, its tiniest distinguishable element may be termed as a pixel. In a 3D image, its tiniest distinguishable element may be termed as a voxel ("a volumetric pixel" or "a volume pixel"). The image may include one or more 2D regions of interest (2D ROIs) and/or 3D volumes of interest (3D VOIs). A 2D ROI may include one or more pixels in a 2D image (or a certain image layer of a 3D image). A 3D VOI may include one or more voxels in a 3D image. A 3D VOI may include one or more anatomies of interest of one or more image layers. The 2D ROIs/3D VOIs may correspond to one or more tissues in the image or a part thereof. For example, the 2D ROIs/3D VOIs may refer to a tumor, sclerotic tissue, diseased tissue, or the like in the image. The processing module 310 may perform processing the pixels/voxels corresponding to a tissue, an organ, or a related portion (e.g., a colon, a small intestine, a lung, air and liquid therein, etc.) in an image. For example, the processing module 310 may determine a 2D ROI/3D VOI, transmit a 2D ROI/3D VOI, edit a 2D ROI/3D VOI, combine two or more 2D ROIs/3D VOIs, recognize or segment tissue in an image, remove one or more regions or volumes from an image, or the like.

The anatomy of interest determination unit 410 may determine a 2D region/3D volume based on image data. In some embodiments, the anatomy of interest determination unit 410 may determine a 2D region/3D volume by drawing the 2D region/3D volume in an image. For example, a user may draw a 2D region/3D volume using the input/output module 340. The anatomy of interest determination unit 410 may receive one or more instructions related to the drawing and determine the 2D region/3D volume in the image. Thus, in some embodiments, the determination of the 2D region/3D volume may be also referred to as the drawing of the 2D region/3D volume. The anatomy of interest determination unit 410 may draw one or more specific 2D regions/3D volumes based on an image. In some embodiments, the specific 2D region/3D volume may be a 2D region of interest (2D ROI) and/or 3D volume of interest (3D VOI). The anatomy of interest determination unit 410 may draw a 2D region/3D volume in a specific shape. The 2D region/3D volume in a specific shape may include a 2D region/3D volume in a regular shape and/or a 2D region/3D volume in an irregular shape. The 2D region/3D volume in a regular shape may include a rectangle, a square, a diamond, a round, an oval, a triangle, a cuboid, a cube, a pyramid, a sphere, etc. The 2D region/3D volume in an irregular shape may include a 2D region/3D volume in any user-defined shape. In some embodiments, the anatomy of interest determination unit 410 may change a part of the 2D region/3D volume and/or any boundary thereof. The changing operation may include stretching, dragging, enlarging, reducing, erasing, thickening, coloring, etc. For example, a user may color a 2D region/3D volume drawn by the anatomy of interest determination unit 410 through the user interface 280. In some embodiments, the anatomy of interest determination unit 410 may draw a 2D ROI/3D VOI in an image processed by the anatomy of interest determination unit 410, the transmitting unit 420, the editing unit 430, and/or the combination unit 440.

The transmitting unit 420 may transmit a 2D ROI/3D VOI based on the image data. The transmitting unit 420 may transmit one or more 2D ROIs/3D VOIs. The transmitting may refer to copying a shape of a 2D region/3D volume in an image to a different location of the same image or to a different image. For example, the transmitting unit 420 may copy shapes of one or more regions in a layer of an image to a different location in the same layer of the image. As another example, the transmitting unit 420 may copy shapes of one or more regions in a layer of an image to a same location in another layer of the image. As a further example, the transmitting unit 420 may copy shapes of one or more volumes in a 3D image to a same location in another 3D image. In some embodiments, the transmitting may refer to generating a 2D region/3D volume with the same shape at a corresponding location in an image without changing the pixel/voxel value information of the image.

In some embodiments, based on the location of a specific 2D ROI/3D VOI, the transmitting unit 420 may transmit the specific 2D ROI/3D VOI among different image layers in a same 3D image (i.e., volume data). Merely by way of example, the transmitting unit 420 may transmit a specific 2D ROI/3D VOI among different image layers in the same volume data, based on a 2D coordinate location of the specific 2D ROI/3D VOI. For example, for a 2D ROI (e.g., $ROI_1$) in an image layer of volume data, the transmitting unit 420 may determine the location information (e.g., 3D coordinate location (x, y, z)) of one or more reference voxels in the 2D ROI, and generate a 2D ROI at a corresponding location (e.g., 3D coordinate location (x, y, z')) in another image layer of the volume data, based on the location information. The reference voxel may be any voxel in the 2D ROI (e.g., $ROI_1$), for example, a center voxel or a voxel on an edge of $ROI_1$. In the transmitting, a relative location of the reference voxel within the 2D ROI may remain constant. In some embodiments, the location information of a reference voxel in a 2D ROI/3D VOI may be used to represent location information of the 2D ROI/3D VOI. In some embodiments, the transmitting unit 420 may transmit the 2D ROI/3D VOI among one or more image layers (e.g., a first image layer $z_1$ and a second image layer $z_2$ in a Z axis direction, a first image layer $y_1$ and a second image layer $y_2$ in a Y axis direction, a first image layer $x_1$ and a second image layer $x_2$ in an X axis direction, etc.) in a set of volume data. In the present disclosure, an image layer may correspond to a data layer, and "image layer" and "data layer" may be used interchangeably. The one or more image layers may correspond to the transmitting depths in one or more transmitting directions. In some embodiments, the transmitting direction may be perpendicular to a plane surface of the 2D ROI/3D VOI to be transmitted. In some embodiments, the transmitting direction may form an inclined angle with the plane surface of the 2D ROI/3D VOI to be transmitted. Merely by way of example, the transmitting direction may be a Z axis positive direction and/or Z axis negative direction of the volume data, a Y axis positive direction and/or Y axis negative direction of the volume data, an X axis positive direction and/or X axis negative direction of the volume data, or any other direction in a three-dimensional space coordinate system. For example, the transmitting unit 420 may transmit a 2D ROI (e.g., $ROI_1$) in an X-Y plane to a first image layer $z_1$ and obtain another 2D ROI (e.g., $ROI_1'$) in which a reference voxel may have a 3D coordinate location (x, y, $z_1$) in the first image layer $z_1$. As another example, the transmitting unit 420 may transmit $ROI_1$ to a second image layer $z_2$ and obtain another 2D ROI (e.g., $ROI_1''$) in which a reference voxel may have a 3D coordinate location (x, y, $z_2$) in the second image layer $z_2$. As a further example, the transmitting unit 420 may transmit a 2D ROI (e.g., $ROI_2$ in which a reference voxel may have a 3D coordinate location (x, y, z)) in an X-Z plane to a first data layer $y_1$, and obtain another 2D ROI ($ROI_2'$) in which the reference voxel may have a 3D coordinate location (x, $y_1$, z) in the first data layer $y_1$. As still another example, the transmitting unit 420 may transmit $ROI_2$ to a second data layer $y_2$ and obtain another 2D ROI (e.g., $ROI_2''$) in which the reference voxel may have a 3D coordinate location (x, $y_2$, z) in the second data layer $y_2$. As still another example, the transmitting unit 420 may transmit a 2D ROI (e.g., $ROI_3$ in which a reference voxel may have a 3D coordinate location (x, y, z)) in a Y-Z plane to a first data layer $x_1$, and obtain another 2D ROI (e.g., $ROI_3'$) in which the reference voxel may have a 3D coordinate location ($x_1$, y, z) in the first data layer $x_1$. As still another example, the transmitting unit 420 may transmit $ROI_3$ to a second data layer $x_2$ and obtain another 2D ROI (e.g., $ROI_3''$) in which the reference voxel may have a 3D coordinate location ($x_2$, y, z) in the second data layer $x_2$. In some embodiments, the Z axis positive direction may be from the front side to the rear side of the imaging device 110 along the axis of a scanning channel of the imaging device 110. The Z axis negative direction may be from the rear side to the front side of the imaging device 110 along the axis of a scanning channel of the imaging device 110. The Y axis positive direction may be from the upper part to the lower part of the imaging device 110. The Y axis negative direction may be from the lower part to the upper part of the imaging device 110. The X axis positive direction may be from the right side to the left side of the imaging device 110. The X axis negative direction may be from the left side to the right side of the imaging device 110. The transmitting depth may be a height in a Z axis, a Y axis, and/or an X axis of the volume data. One or more data layers in the volume data may be determined based on a layer spacing of the volume data. The layer spacing may be 0.1-20 mm or any other appropriate spacing. There may be different layer spacing in different axis directions including, for example, a layer spacing in the X axis direction, a layer spacing in the Y axis direction, and a layer spacing in the Z axis direction. The layer spacing in different axis directions may be the same or different. In some embodiments, the transmitting unit 420 may transmit a specific 2D region/3D volume among different sets of volume data, based on a coordinate location (e.g., a 3D coordinate location) of the specific 2D region/3D volume. For example, in a first set of volume data $VOI_1$, the transmitting unit 420 may determine a 3D coordinate location (x, y, z) of a reference voxel in $VOI_1$, and may generate a $VOI_1'$ with the same shape as $VOI_1$ at the same 3D coordinate location (x, y, z) in another set of volume data. The reference voxel may be any voxel in $VOI_1$, for example, a center voxel or a voxel on the surface of $VOI_1$. In some embodiments, location information of a reference voxel in a 3D VOI may represent the location information of the 3D VOI. In the transmitting, a relative location of the reference voxel within a 3D VOI may remain constant. In some embodiments, the transmitting unit 420 may receive a 2D ROI/3D VOI transmitted among different data layers and/or different sets of volume data. In some embodiments, the transmitting unit 420 may determine (e.g., draw) a transmitted 2D ROI/3D VOI in different data layers and/or different sets of volume data through the ROI determination unit 410. The transmitting unit 420 may transmit a 2D ROI/3D VOI in an image processed by the ROI determination unit 410, the editing unit 430, the transmitting unit 420, and/or the combination unit 440.

The editing unit 430 may edit a 2D ROI/3D VOI based on the image data. In some embodiments, the editing unit 430 may edit a 2D ROI/3D VOI by clipping the 2D ROI/3D VOI. The editing unit 430 may reserve a 2D region/3D volume of a 2D ROI/3D VOI in a set of volume data or a data layer, and/or clip (or remove) one or more candidate 2D regions/3D volumes to be removed from the 2D ROI/3D VOI. In some embodiments, the editing unit 430 may implement the clipping function through set (e.g., pixel/voxel set) operation. Merely by way of example, the editing unit 430 may clip a specific 2D region/3D volume to be removed from a 2D ROI/3D VOI to obtain a clipping result (i.e., a difference set between the 2D ROI/3D VOI and the specific 2D region/3D volume to be clipped). For example, the editing unit 430 may clip a pixel/voxel set corresponding to the specific 2D region/3D volume not needed from a pixel/voxel set of the 2D ROI/3D VOI. In some embodiments, the editing unit 430 may adjust a clipped 2D ROI/3D VOI. Merely by way of example, the editing unit 430 may restore a mis-clipped 2D region/3D volume. For example, the editing unit 430 may restore a 2D ROI/3D VOI by combining the pixel/voxel sets of mis-clipped 2D regions/3D volumes. The editing unit 430 may perform clipping based on image data processed by the ROI determination unit 410, the transmitting unit 420, the editing unit 430, and/or the combination unit 440.

The combination unit 440 may combine two or more 2D ROIs/3D VOIs based on the image data. The combination unit 440 may combine two or more specific 2D regions/3D volumes (e.g., 2D ROIs/3D VOIs). In some embodiments, the combination unit 440 may combine specific 2D regions/3D volumes by combining the pixel/voxel sets corresponding to the specific 2D regions/3D volumes. In some embodiments, a combining result may be a union set of two or more candidate pixel/voxel sets to be combined. In some embodiments, the combination unit 440 may combine at least two candidate 2D regions/3D volumes. In some embodiments, the combination unit 440 may combine at least two candidate volumes. In some embodiments, the combination unit 440 may combine one or more candidate 2D regions/3D volumes, and one or more candidate volumes. Merely by way of example, the combination unit 440 may combine at least two candidate 2D regions/3D volumes. For example, the combination unit 440 may combine data of two different candidate anatomies of interest (e.g., a first 2D ROI$_1$ and a second 2D ROI$_2$) in a same data layer or different data layers. As another example, the combination unit 440 may combine data of at least two connected or non-connected 2D regions/3D volumes in a same data layer or different data layers for further analyzing. As a further example, the combination unit 440 may combine at least two connected or non-connected 2D regions/3D volumes in a same set of volume data or different sets of volume data. The combination unit 440 may perform combining based on 2D ROIs/3D VOIs processed by the anatomy of interest determination unit 410, the transmitting unit 420, the combination unit 440, and/or the editing unit 430.

The analyzing unit 450 may analyze the information of a 2D ROI/3D VOI based on the image data. In some embodiments, the analyzing unit 450 may analyze the feature information (e.g., statistical feature information) of a 2D ROI/3D VOI. The statistical feature information may include a variance, an area, a length, an average value, a maximum value, a minimum value, a volume, or the like, or a combination thereof. In some embodiments, the feature information may relate to grayscales such as a grayscale distribution, a grayscale average value, etc. The analyzing unit 450 may display an analyzing result on the user interface 280 through the input/output module 340. The analyzing unit 450 may analyze an image, a 2D ROI/3D VOI, or the like, processed by the anatomy of interest determination unit 410, the transmitting unit 420, the editing unit 430, and/or the combination unit 440. In some embodiments, the analyzing unit 450 may analyze whether a specific 2D region/3D volume needs to be further processed or not. For example, the analyzing unit 450 may determine whether a further drawing, clipping, transmitting, and/or combining is performed based on the 2D ROI/3D VOI.

It should be noted that the above description of the processing module 310 is provided for the purpose of illustration, and not intended to limit the scope of the present disclosure. Various variations and modifications may be conducted under the teaching of the present disclosure. However, those variations and modifications may not depart from the spirit and scope of this disclosure. For example, the processing module 310 may also include an independent unit to implement image data processing. The independent unit may be independent of the anatomy of interest determination unit 410. As another example, the independent unit may implement functions of the anatomy of interest determination unit 410, the transmitting unit 420, the editing unit 430, the combination unit 440, and/or the analyzing unit 450. In some embodiments, some units may be unnecessary, for example, the anatomy of interest determination unit 410. In some embodiments, the processing module 310 may include other units or subunits not shown.

Figure 5:
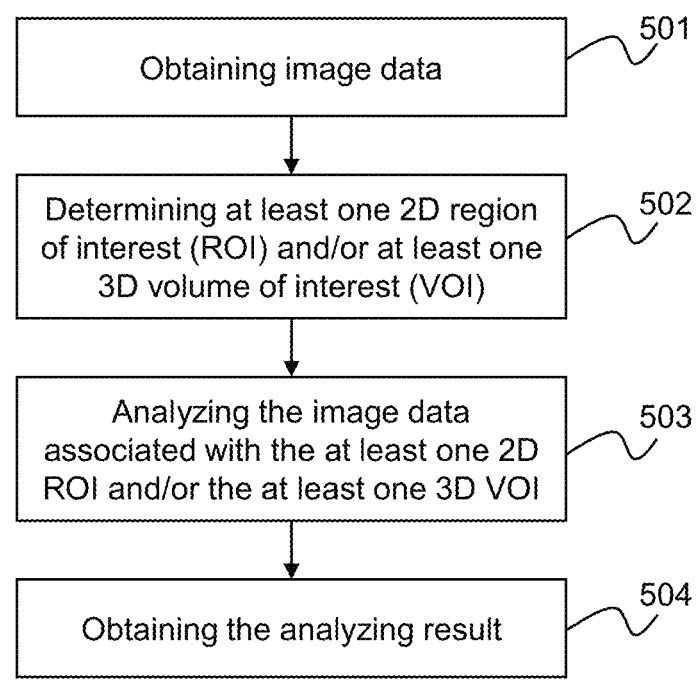
FIG. 5 is a flowchart illustrating an exemplary process for processing an image according to some embodiments of the present disclosure.

FIG. 5 is a flowchart illustrating an exemplary process for processing an image according to some embodiments of the present disclosure. Process 500 may be implemented by the processing device 120. In 501, the image data may be obtained. In some embodiments, 501 may be implemented by the input/output module 340. In some embodiments, the image data may be obtained by the imaging device 110 by scanning an object or a part thereof. In some embodiments, the image data may be obtained from an internal storage device (e.g., the storage device 140, the storage module 330). In some embodiments, the image data may be obtained from an external storage device (e.g., a network storage device, a cloud disk, a mobile hard disk, etc., or a combination thereof). The image data may include an image matrix, image information, image vectors, bitmaps, motion graphs, image coding, primitives, sections, etc., or a combination thereof.

In some embodiments, the image data may be medical image data. In some embodiments, the medical image data may be obtained through one or more scanners. The scanners may include an MRI scanner, a CT scanner, a PET scanner, a SPECT scanner, a computed tomography colonography (CTC) scanner, etc., or a combination thereof. In some embodiments, the image data may be data obtained by scanning an organ, a body, an object, dysfunction, a tumor, etc., or any combination thereof. In some embodiments, the image data may be data obtained by scanning a head, a chest, an organ, a bone, a blood vessel, a colon, etc., or any combination thereof. In some embodiments, the image data may be 2D data and/or 3D data. In some embodiments, the image data may include a plurality of 2D pixels or 3D voxels. A value of the image data may correspond to one or more properties of the pixel or voxel, such as a grayscale, a brightness, a color, an absorbance of the X-ray or y-ray, a hydrogen atom density, a biomolecule metabolism, a receptor and neurohumor activity, etc.

In 502, at least one 2D ROI and/or at least one 3D VOI may be determined based on the image data obtained in 501. In some embodiments, operation 502 may be implemented by one or more combinations of the anatomy of interest determination unit 410, the transmitting unit 420, the editing unit 430, and the combination unit 440 in the processing module 310. The determining of a 2D ROI/3D VOI may include drawing a 2D ROI/3D VOI, transmitting a 2D ROI/3D VOI, clipping a 2D ROI/3D VOI, and/or combining 2D ROIs/3D VOIs. In some embodiments, the anatomy of interest may include a 2D ROI and/or a 3D VOI. The 2D ROIs may be regions with different sizes and/or different shapes. For example, the anatomy of interest may be a specific region delineated through a circle, an oval, a square, a rectangle, an irregular polygon, or the like. For example, the specific region may be a region which needs to be further processed. The drawing of an anatomy of interest may be delineating a specific region in a set of volume data. In some embodiments, the processing module 310 may determine one or more 3D VOIs. The transmitting of an anatomy of interest may be transmitting an anatomy of interest of a data layer to other data layers in the same volume data. The transmitting of an anatomy of interest may be transmitting an anatomy of interest in a set of volume data to other sets of volume data. The clipping of an anatomy of interest may be removing a specific region from an anatomy of interest. The combining of anatomies of interest may be combining two or more anatomies of interest. In some embodiments, the combining of two anatomies of interest may be combining image data of the two anatomies of interest. For example, the combining of the anatomies of interest may be combining pixel/voxel sets of the two anatomies of interest.

In 503, the image data associated with the at least one 2D ROI or the at least one 3D VOI determined in 502 may be analyzed. In some embodiments, operation 503 may be implemented by the analyzing unit 450 of the processing module 310. In some embodiments, the analyzing of the image data associated with the at least one 2D ROI/3D VOI may include analyzing feature information of the at least one 2D ROI/3D VOI. The feature information may include statistical feature information. For example, the statistical feature information may include a variance, an area, a length, an average value, a maximum value, a minimum value, a volume, or a combination thereof. In some embodiments, the analyzing of the image data may include determining whether a target object is in the at least one 2D ROI/3D VOI. The target object may include a tissue, an organ, and/or related content (e.g., a colon, a small intestine, a lung, air and/or liquid therein, etc.). If the target object is determined to be in the 2D ROI/3D VOI, it may be further determined whether the target object satisfies a condition. The condition may relate to a certain threshold of an area and/or a certain threshold of a volume. If the target object satisfies the condition, the image data may be further analyzed and/or processed.

In 504, the analyzing result may be obtained. In some embodiments, the analyzing result may be displayed. In some embodiments, operation 504 may be implemented by the input/output module 340. For example, the analyzing result may be displayed on the user interface 280 by the input/output module 340 and/or input/output component 260. In some embodiments, the analyzing result may include feature information of the image data related to the 2D ROI/3D VOI analyzed in 503. The analyzing result may be output to other modules of the image processing system 100. For example, the input/output module 340 may send the analyzing result to the imaging device 110 and/or storage device 140 directly and/or via the network 130. In some embodiments, the analyzing result may be displayed by a display module of the imaging device 110 and/or processing device 120. In some embodiments, in 504, the analyzing result may be sent to a module or device outside of the system. The input/output module 340 may send the analyzing result by a wired or wireless way, or a combination thereof. For example, the analyzing result may be sent to a module or device outside of the system through a communication module of the processing device 120. In some embodiments, in 504, the analyzing result may be further stored in the storage module 330 and/or storage device 140. In some embodiments, in 504, image data obtained in 501, the at least one 2D ROI/3D VOI determined in 502, or other information related to the intermediate states of process 500 may be displayed.

It should be noted that the above description of the process 500 is provided for the purpose of illustration, and not intended to limit the scope of the present disclosure. Various variations and modifications may be conducted under the teaching of the present disclosure. However, those variations and modifications may not depart from the spirit and scope of this disclosure. In some embodiments, one or more operations in process 500 may be omitted. For example, operation 503 and/or operation 504 may be omitted. In some embodiments, process 500 may include one or more other operations such as processing image data related to the 2D ROI/3D VOI.

Figure 6:
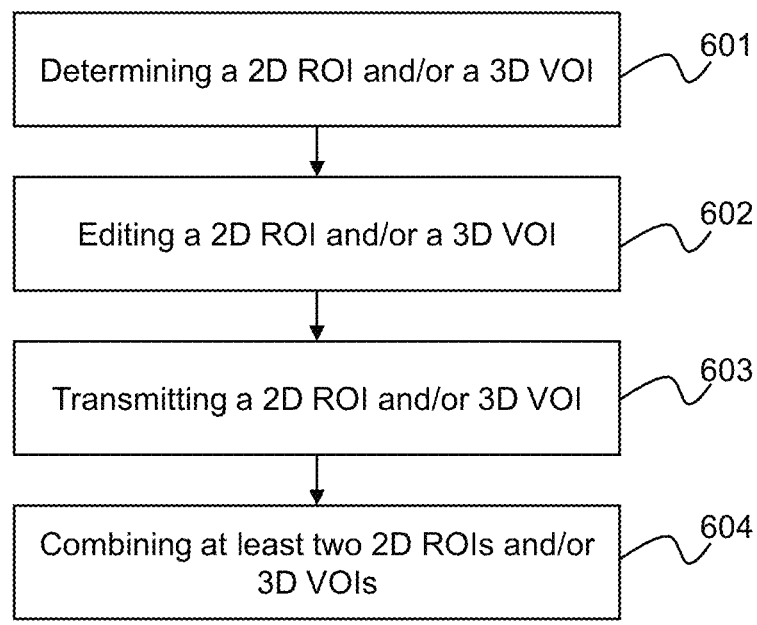
FIG. 6 is a flowchart illustrating an exemplary process for determining an anatomy of interest (2D ROI/3D VOI) according to some embodiments of the present disclosure.

FIG. 6 is a flowchart illustrating an exemplary process for determining an anatomy of interest (2D ROI/3D VOI) according to some embodiments of the present disclosure. Process 600 may be implemented by the processing module 310 of the processing device 120.

In 601, one or more anatomies of interest (2D ROIs/3D VOIs) may be determined. In some embodiments, 601 may be implemented by the anatomy of interest determination unit 410 of the processing module 310. In some embodiments, one or more 2D ROIs/3D VOIs may be determined in 601 by drawing. The one or more 2D ROIs/3D VOIs may be drawn based on the image data obtained in 501. The image data may relate to medical image(s). The medical image(s) may include an MRI image, a CT image, a PET image, a SPECT image, a CTC image, etc. Merely by way of example, a 2D ROI/3D VOI may be drawn based on image data in the DICOM 3.0 format.

In some embodiments, in 601, the 2D ROI/3D ROI may be drawn manually, automatically, or a combination thereof. The automatic drawing may indicate that the 2D ROI/3D VOI with a specific shape may be automatically outlined at a specific location of the image data by the system. The specific location may be determined according to a system default and/or selected by a user. The specific shape of the 2D ROI/3D VOI may be determined by the system and/or selected by a user. For example, a user (e.g., a doctor, a specialist) may select a specific location of the image data and/or a specific shape/volume of the 2D ROI/3D ROI to be drawn based on experience. In some embodiments, the anatomy of interest determination unit 410 may draw a 2D ROI/3D VOI with a corresponding shape at a corresponding location in the image data based on locations and/or shapes of one or more already drawn 2D ROIs/3D VOIs. In some embodiments, the anatomy of interest determination unit 410 may extract a 2D ROI/3D VOI by segmenting the image data using one or more algorithms. The algorithm may include an image segmentation algorithm, for example, a greyscale threshold segmentation algorithm, a region growing splitting and merging algorithm, an edge segmentation algorithm, a histogram-based algorithm, a fuzzy-theory-based segmentation algorithm (e.g., a fuzzy threshold segmentation algorithm, a fuzzy connectedness segmentation algorithm, and a fuzzy clustering segmentation algorithm), a neural-network-based segmentation algorithm, a mathematical-morphology-based segmentation algorithm (e.g., a morphology watershed algorithm), or any combination thereof. The manual drawing may refer to that the 2D ROI/3D VOI with a specific shape may be manually outlined at a specific location of the image data by a user. The specific shape may include a regular and/or irregular shape. The drawing of a 2D ROI/3D VOI may include drawing a 2D ROI/3D VOI with a specific shape, and may also include one or more other operations performed based on the drawn 2D ROI/3D VOI and/or a boundary of the 2D ROI/3D VOI. For example, exemplary operation may include a modification of the drawn 2D ROI/3D VOI. The modification may include stretching, dragging, erasing, thickening, coloring, etc. For example, the user may modify the drawn 2D ROI/3D VOI by dragging a boundary of the 2D ROI/3D VOI.

In some embodiments, a 2D ROI/3D VOI with a specific shape may be drawn inside an existing 2D ROI/3D VOI. In some embodiments, the existing 2D ROI/3D VOI may be a 2D ROI/3D VOI obtained by drawing, editing, transmitting, and/or combining. For example, in 601, one or more 2D ROIs/3D VOIs may be drawn based on a 2D ROI/3D VOI edited in 602, a 2D ROI/3D VOI transmitted in 603, and/or 2D ROIs/3D VOIs combined in 604. As another example, another 2D ROI/3D VOI may be drawn inside the 2D ROI/3D VOI drawn in 601. In some embodiments, a further drawing, editing, transmitting, and/or combining operation may be performed base on the 2D ROI/3D VOI drawn in 601.

In 602, one or more 2D ROIs/3D VOIs may be edited. In some embodiments, operation 602 may be implemented by the editing unit 430 of the processing module 310. The 2D ROIs/3D VOIs may be edited by clipping one or more candidate 2D regions/3D volumes to be removed. In some embodiments, a candidate 2D region/3D volume may be removed from the one or more 2D ROIs/3D VOIs. In some embodiments, a candidate 2D region/3D volume to be clipped may be adjusted in 602. For example, the adjusting may include restoring an already removed 2D region/3D volume, enlarging or reducing the candidate 2D region/3D volume to be clipped, changing a shape or location of the candidate 2D region/3D volume to be clipped, or the like. In some embodiments, the clipping of a 2D ROI/3D VOI may be implemented based on a set operation. For example, the clipping of the 2D ROI/3D VOI may be realized by determining a difference set between a pixel/voxel set of the 2D ROI/3D VOI and a pixel/voxel set of the candidate 2D region/3D volume inside the 2D ROI/3D VOI.

In some embodiments, the 2D ROI/3D VOI may be clipped inside an existing 2D ROI/3D VOI. In some embodiments, the existing 2D ROI/3D VOI may be obtained by drawing, clipping, transmitting, and/or combining. For example, in 602, a 2D ROI/3D VOI may be clipped based on the 2D ROI/3D VOI drawn in 601, the 2D ROI/3D VOI transmitted in 603, and/or the 2D ROIs/3D VOIs combined in 604. As another example, in 602, the clipping operation may be performed based on an already clipped 2D ROI/3D VOI. In some embodiments, a further drawing, clipping, transmitting, and/or combining operation may be performed based on the 2D ROI/3D VOI clipped in 602.

In 603, one or more 2D ROIs/3D VOIs may be transmitted. In some embodiments, operation 603 may be implemented by the transmitting unit 420 of the processing module 310. In some embodiments, the position information and/or shape information of the 2D ROI/3D VOI may be transmitted. The position information may include a 2D location, a 3D location, etc. The shape information may include a regular shape, an irregular shape, etc. In some embodiments, the 2D ROI/3D VOI may be transmitted in the same set of volume data or to a different set of volume data. For example, the 2D ROI/3D VOI may be transmitted in different data layers of the same volume data based on the 2D location of the 2D ROI/3D VOI. As another example, the 2D ROI/3D VOI may be transmitted to different volume data based on the 3D location of the 2D ROI/3D VOI.

In some embodiments, the transmitting unit 420 may copy the shape information of the candidate 2D ROI/3D VOI to be transmitted to the target image data in which a similar 2D ROI/3D VOI may be generated based on the position information of the 2D ROI/3D VOI to be transmitted. In some embodiments, the transmitting may be performed between different data layers of the same volume data, and the generated 2D ROI/3D VOI may have the same 2D location and/or shape with the candidate 2D ROI/3D VOI to be transmitted. In some embodiments, the transmitting may be performed between different sets of volume data, and the generated 2D ROI/3D VOI may have the same 3D location and/or shape with the candidate 2D ROI/3D VOI to be transmitted. In some embodiments, pixel/voxel values of the data layers and/or the volume data may not be changed in 603.

In some embodiments, an existing 2D ROI/3D VOI may be transmitted. In some embodiments, the existing 2D ROI/3D VOI may be a 2D ROI/3D VOI obtained by drawing, clipping, transmitting and/or combining. For example, the 2D ROI/3D VOI drawn in 601, the 2D ROI/3D VOI edited in 602, and/or the 2D ROIs/3D VOIs combined in 604 may be transmitted in 603. In some embodiments, a further drawing, clipping, transmitting, and/or combining operation may be performed based on the 2D ROI/3D VOI transmitted in 603.

In 604, at least two 2D ROIs/3D VOIs may be combined. In some embodiments, operation 604 may be implemented by the combination unit 440 of the processing module 310. In some embodiments, the data of the at least two 2D ROIs/3D VOIs may be combined. The data may include feature information. The feature information may include statistical feature information. In some embodiments, the statistical feature information may include a variance, an area, a length, an average value, a maximum value, a minimum value, a volume, etc. In some embodiments, the combination of the at least two 2D ROIs/3D VOIs may be implemented based on a set operation. For example, the combination unit 440 may determine a union set of at least two pixel/voxel sets corresponding to the at least two 2D ROIs/3D VOIs.

In some embodiments, two existing 2D ROIs/3D VOIs may be combined. In some embodiments, the existing 2D ROIs/3D VOIs may be obtained by drawing, clipping, transmitting, and/or combining. For example, two or more of the 2D ROI/3D VOI drawn in 601, the 2D ROI/3D VOI clipped in 602, and the 2D ROI/3D VOI transmitted in 603 may be combined in 604. As another example, a clipped 2D ROI/3D VOI and a combined 2D ROI/3D VOI may be combined in 604. As a further example, a transmitted 2D ROI/3D VOI and a drawn 2D ROI/3D VOI may be combined in 604. In some embodiments, a further drawing, clipping, transmitting, and/or combining may be performed based on the 2D ROIs/3D VOIs combined in 604.

It should be noted that the above description of the process 600 is provided for the purpose of illustration, and not intended to limit the scope of the present disclosure. Various variations and modifications may be conducted under the teaching of the present disclosure. However, those variations and modifications may not depart from the spirit and scope of this disclosure. In some embodiments, one or more of the operations may be omitted or skipped from the process 600. For example, operation 602 and/or operation 603 may be omitted. In some embodiments, the order of the operations performed in process 600 may be changed. For example, operation 603 may be performed first, and then operation 602 may be performed. In some embodiments, one or more of operations of process 600 may be repeated. For example, operation 602 and/or operation 603 may be performed after operation 604. In some embodiments, a 2D ROI drawn in 601, a 2D ROI clipped in 602, a 2D ROI transmitted in 603, and/or 2D ROIs combined in 604 may be replaced with 3D VOIs. Operations such as drawing, clipping, transmitting, and combining may be performed on the 2D ROIs/3D VOIs with reference to the process 600.

Figure 7A:
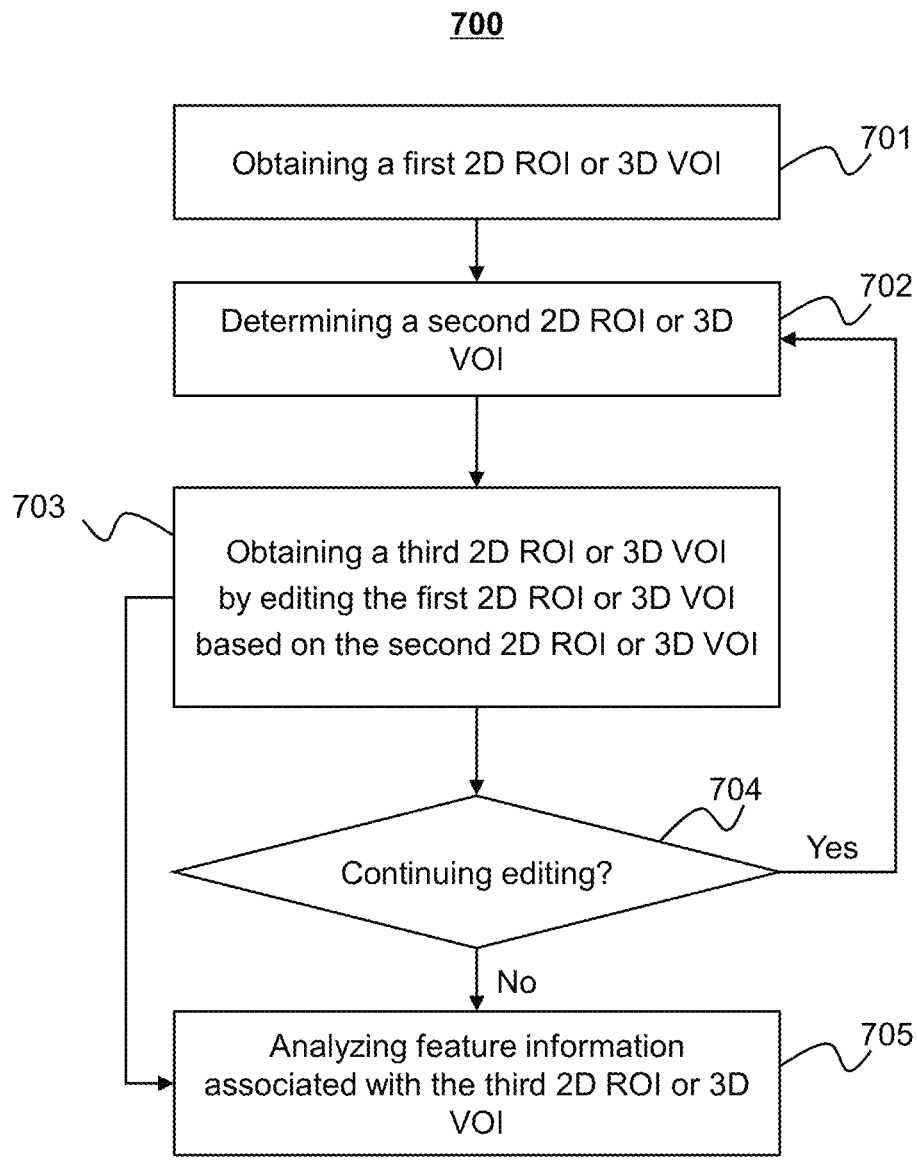
FIG. 7A is a flowchart illustrating an exemplary process for editing an anatomy of interest (2D ROI/3D VOI) according to some embodiments of the present disclosure.

FIG. 7A is a flowchart illustrating an exemplary process for editing an anatomy of interest (2D ROI/3D VOI) according to some embodiments of the present disclosure. Process 700 may be implemented by the editing unit 430 of the processing module 310. In some embodiments, operation 602 in process 600 may be performed according to process 700. In some embodiments, the clipping of the 2D ROI/3D VOI may be implemented based on a set operation of the pixels/voxels of the 2D ROI/3D VOI.

Figure 7B:
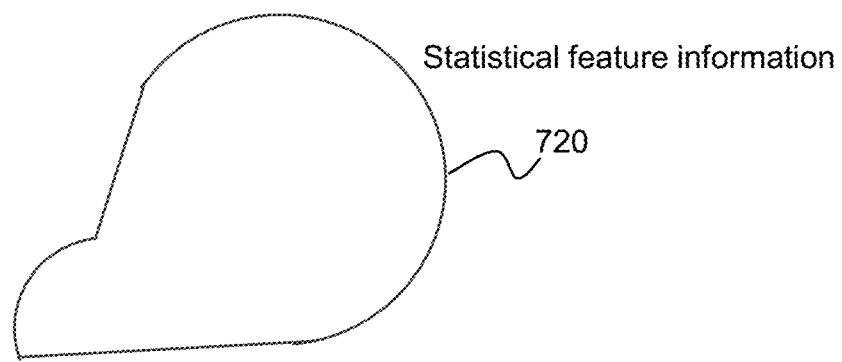
FIG. 7B is a schematic diagram illustrating an exemplary anatomy of interest (2D ROI/3D VOI) according to some embodiments of the present disclosure.

In 701, a first 2D ROI/3D VOI may be obtained. In some embodiments, 701 may be implemented by the input/output module 340 and/or the storage module 330 of the processing device 120. The obtained first 2D ROI/3D VOI may include a drawn 2D ROI/3D VOI, a transmitted 2D ROI/3D VOI, combined 2D ROIs/3D VOIs, and/or a clipped 2D ROI/3D VOI. For example, the first 2D ROI/3D VOI may be drawn by the ROI determination unit 410 of the processing module 310. In some embodiments, the first 2D ROI/3D VOI may be a connected region or a non-connected region. FIG. 7B is a schematic diagram illustrating an exemplary anatomy of interest (2D ROI/3D VOI) according to some embodiments of the present disclosure. In FIG. 7B, a 2D ROI/3D VOI 720 may be a connected or non-connected 2D region/3D volume with an irregular shape. In some embodiments, the user interface 280 may display the 2D ROI/3D VOI 720 and/or feature information thereof, for example, statistical feature information.

In 702, a second 2D ROI/3D VOI may be determined. In some embodiments, 702 may be implemented by the ROI determination unit 410 of the processing module 310. In some embodiments, the second 2D ROI/3D VOI may be drawn inside the first 2D ROI/3D VOI. In some embodiments, the second 2D ROI/3D VOI may be drawn inside and outside the first 2D ROI/3D VOI. In some embodiments, the second 2D ROI/3D VOI may be a part of the first 2D ROI/3D VOI. The second 2D ROI/3D VOI may be a part of the first 2D ROI/3D VOI that is not to be analyzed. In some embodiments, one part of the second 2D ROI/3D VOI may be inside the first 2D ROI/3D VOI, and the other part of the second 2D ROI/3D VOI may be outside the first 2D ROI/3D VOI, that is, there are one or more intersections or overlapped parts between the second 2D ROI/3D VOI and the first 2D ROI/3D VOI. That is to say, the second 2D ROI/3D VOI may be completely inside the first 2D ROI/3D VOI, or the second 2D ROI/3D VOI and the first 2D ROI/3D VOI may be partly overlapped. For example, the second 2D ROI/3D VOI may be a cavity structure inside a tissue. The cavity structure may be a necrotic region inside an annular tumor, a necrotic region of an annular ischemic lesion in a brain, a hollow structure of a trachea, etc. In some embodiments, in 702, the shape and/or size of the second 2D ROI/3D VOI may be further modified. In some embodiments, operations such as enlarging and/or reducing may also be performed to adjust a boundary of the second 2D ROI/3D VOI. For example, the adjusting of the boundary may include dragging the boundary, setting the size of the boundary, or the like.

Figure 7C:
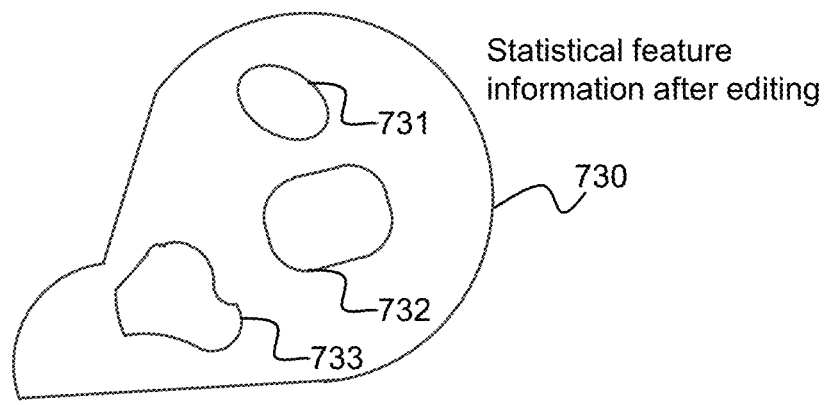
FIG. 7C is a schematic diagram illustrating an exemplary edited anatomy of interest (2D ROI/3D VOI) according to some embodiments of the present disclosure.

In 703, a third 2D ROI/3D VOI may be obtained by editing the first 2D ROI/3D VOI based on the second 2D ROI/3D VOI. In some embodiments, the third 2D ROI/3D VOI may be obtained by clipping the second 2D ROI/3D VOI from the first 2D ROI/3D VOI. In some embodiments, operation 703 may be implemented by the editing unit 430 of the processing module 310. The second 2D ROI/3D VOI may be removed from the inside of the first 2D ROI/3D VOI. The obtained third 2D ROI/3D VOI may be a 2D region or 3D volume of the first 2D ROI/3D VOI. In some embodiments, the second 2D ROI/3D VOI may be inside the first 2D ROI/3D VOI, and the third 2D ROI/3D VOI may be obtained by determining a difference set between the first 2D ROI/3D VOI and the second 2D ROI/3D VOI. In some embodiments, there may be one or more intersections between the second 2D ROI/3D VOI and the first 2D ROI/3D VOI, and the third 2D ROI/3D VOI may be obtained by determining a difference set between the first 2D ROI/3D VOI and the intersections. For example, the obtained third 2D ROI/3D VOI may be an annular tissue structure. The annular structure may be an annular tumor in which necrotic tissues are not included, an annular ischemic lesion in which necrosis inside the brain is not included, etc. In some embodiments, a first set of pixels or voxels corresponding to the first 2D ROI/3D VOI may be determined, a second set of pixels or voxels corresponding to the second 2D ROI/3D VOI may be determined, and a difference set between the first set of pixels or voxels and the second set of pixels or voxels may be designated as the third 2D ROI/3D VOI. FIG. 7C is a schematic diagram illustrating an exemplary edited anatomy of interest (2D ROI/3D VOI) according to some embodiments of the present disclosure. As shown in FIG. 7C, a 2D ROI/3D VOI 730 may be a clipped connected region or a clipped non-connected region. The second 2D ROI/3D VOI to be clipped may be one or more of a 2D ROI/3D VOI 731, a 2D ROI/3D VOI 732, a 2D ROI/3D VOI 733, or the like. For example, the first 2D ROI/3D VOI may be the 2D ROI/3D VOI 730, the second 2D ROI/3D VOI may be the 2D ROI/3D VOI 731, and the third 2D ROI/3D VOI may be a 2D region or 3D volume obtained by removing the 2D ROI/3D VOI 731 from the 2D ROI/3D VOI 730.

In some embodiments, a user may need to recover the second 2D ROI/3D VOI that has been clipped, or a second 2D ROI/3D VOI may be mis-clipped from the first 2D ROI/3D VOI, the clipped second 2D ROI/3D VOI may be recovered in 703. For example, the clipping operation in 703 may be rescinded, or the first 2D ROI/3D VOI may be recovered by combining the third 2D ROI/3D VOI and the second 2D ROI/3D VOI. For example, a pixel/voxel set corresponding to the first 2D ROI/3D VOI may be obtained by combining a pixel/voxel set of corresponding to the third 2D ROI/3D VOI and a pixel/voxel set corresponding to the second 2D ROI/3D VOI.

In 704, whether to continue the editing may be determined. In some embodiments, 704 may be implemented by the analyzing unit 450 of the processing module 310. The determination may be performed based on one or more standards. In some embodiments, the standard may be stored in a storage device (e.g., the storage module 330, and the storage device 140), and the analyzing unit 450 may obtain information related to the standard to perform determination automatically. In some embodiments, the standard may relate to the experience of a user, and a user may perform determination manually when checking the third 2D ROI/3D VOI. The determination may include whether other 2D regions or 3D volumes that are not need to be analyzed are included in the first 2D ROI/3D VOI. For example, the determination may include whether a necrotic region is included inside a tissue.

If it is determined that there is no other 2D region or 3D volume in the first 2D ROI/3D VOI to be edited, process 700 may terminate the clipping. In 705, feature information associated with the third 2D ROI/3D VOI may be analyzed. In some embodiments, 705 may be implemented by the analyzing unit 450 of the processing module 310. In some embodiments, operation 704 may be skipped, and 705 may be performed after operation 703. The feature information may include statistical feature information. As shown in FIG. 7C, if the clipping is not continued, the 2D ROI/3D VOI obtained in process 700 may be a 2D region or 3D volume of the 2D ROI/3D VOI 730 in which the 2D ROI/3D VOI 731 is clipped. Merely by way of example, the 2D ROI/3D VOI 731 may have a regular shape, for example an ellipse.

If it is determined that there is another 2D region or 3D volume in the first 2D ROI/3D VOI to be edited, process 700 may continue the clipping. Process 700 may return to operation 702, and another candidate 2D ROI/3D VOI to be clipped may be drawn in the first 2D ROI/3D VOI. As shown in FIG. 7C, if the clipping is continued, the 2D ROI/3D VOI 732 and/or the 2D ROI/3D VOI 733 may be further removed from the 2D ROI/3D VOI 730. Merely by way of example, the 2D ROI/3D VOI 732 may have a particular shape (e.g., a rounded rectangle). As another example, the 2D ROI/3D VOI 733 may have an irregular shape. In some embodiments, the user interface 280 may display feature information (e.g., statistical feature information) of the clipped 2D ROI/3D VOI 730.

It should be noted that the above descriptions of process 700 and the schematic diagrams of FIGS. 7B and 7C are provided for the purpose of illustration, and not intended to limit the scope of the present disclosure. Various variations and modifications may be conducted under the teaching of the present disclosure. However, those variations and modifications may not depart from the spirit and scope of this disclosure. For example, in some embodiments, one or more of the operations (e.g., operation 704) in process 700 may be omitted. As another example, in process 700, an anatomy of interest may be clipped from another anatomy of interest, a 2D ROI may be clipped from a 3D VOI, a 3D VOI may be clipped from another 3D VOI, and a 3D VOI may be clipped from a 2D ROI (e.g., an intersection between the 3D VOI and the 2D ROI may be clipped from the 2D ROI). These variations are within the scope of the present disclosure.

Figure 8A:
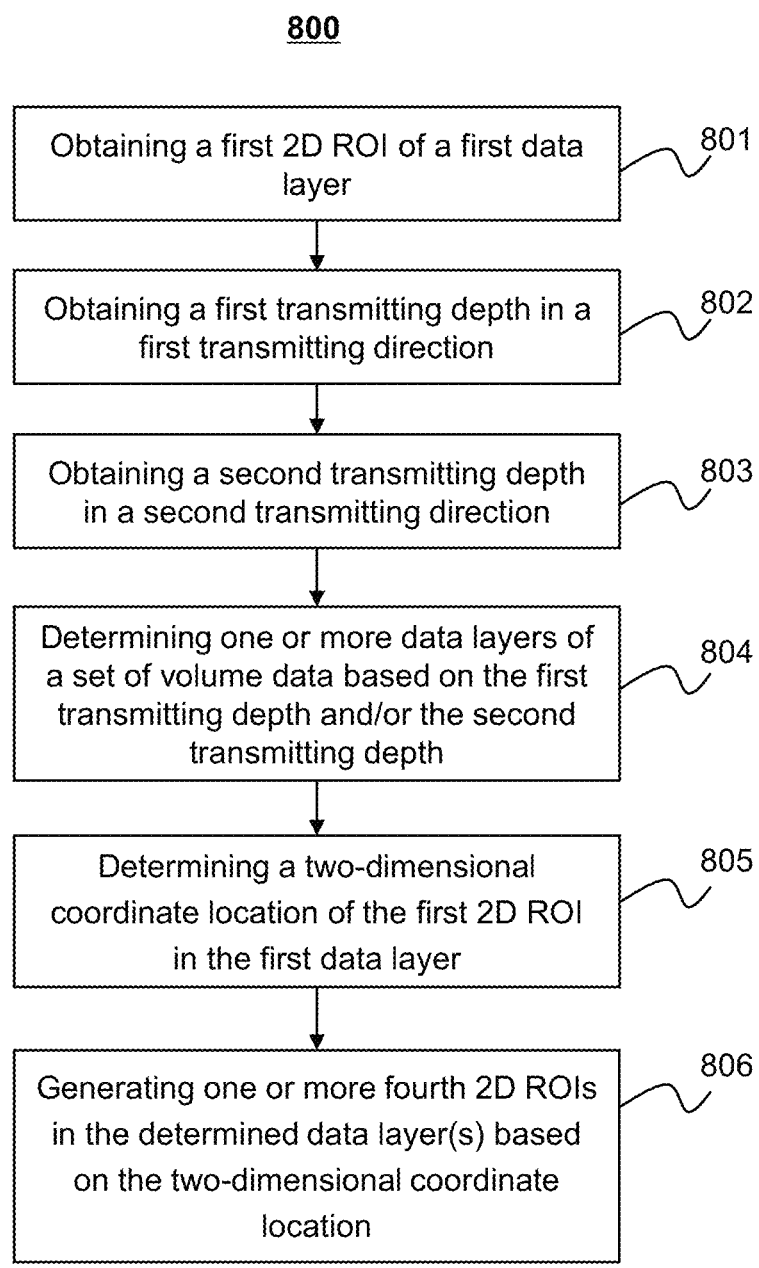
FIG. 8A is a flowchart illustrating an exemplary process for transmitting a 2D ROI according to some embodiments of the present disclosure.

FIG. 8A is a flowchart illustrating an exemplary process for transmitting a 2D ROI according to some embodiments of the present disclosure. Process 800 may be implemented by the transmitting unit 420 of the processing module 310. In some embodiments, operation 603 in process 600 may be performed according to process 800.

Figure 8B:
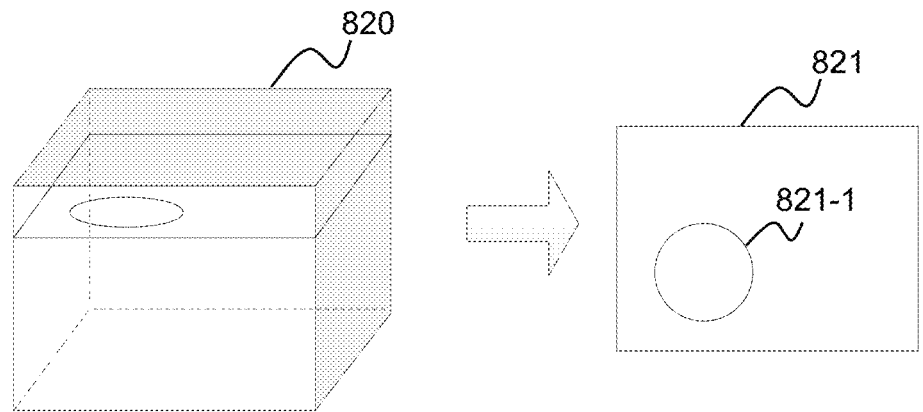
FIG. 8B is a schematic diagram illustrating an exemplary 2D ROI according to some embodiments of the present disclosure.

In 801, a first 2D ROI of a first data layer may be obtained. In some embodiments, operation 801 may be implemented by the input/output module 340 of the processing device 120. In some embodiments, data related to the first 2D ROI may be obtained from the storage module 330 in 801. In some embodiments, a 2D ROI selected by a user that is needed to be transmitted may be obtained by a user via the user interface 280. In some embodiments, the first 2D ROI may be drawn by the anatomy of interest determination unit 410 in 801. FIG. 8B is a schematic diagram illustrating an exemplary 2D ROI according to some embodiments of the present disclosure. In FIG. 8B, a set of volume data 820 may include a data layer 821. The data layer 821 may include a 2D ROI 821-1. It should be noted that the first 2D ROI obtained in 801 may be the same as or different from the first 2D ROI obtained in 701 shown in FIG. 7A. In some embodiments, the first 2D ROI may be a 2D ROI or a plurality of 2D ROIs. The first data layer is only provided for the purpose of illustration, and is not intended to indicate that the data layer is located in the first floor of a set of volume data in a certain axial direction. The first data layer may be located in an X-Y plane, an X-Z plane, a Y-Z plane, or a plane forming any inclined angle with any plane described above.

Figure 8C:
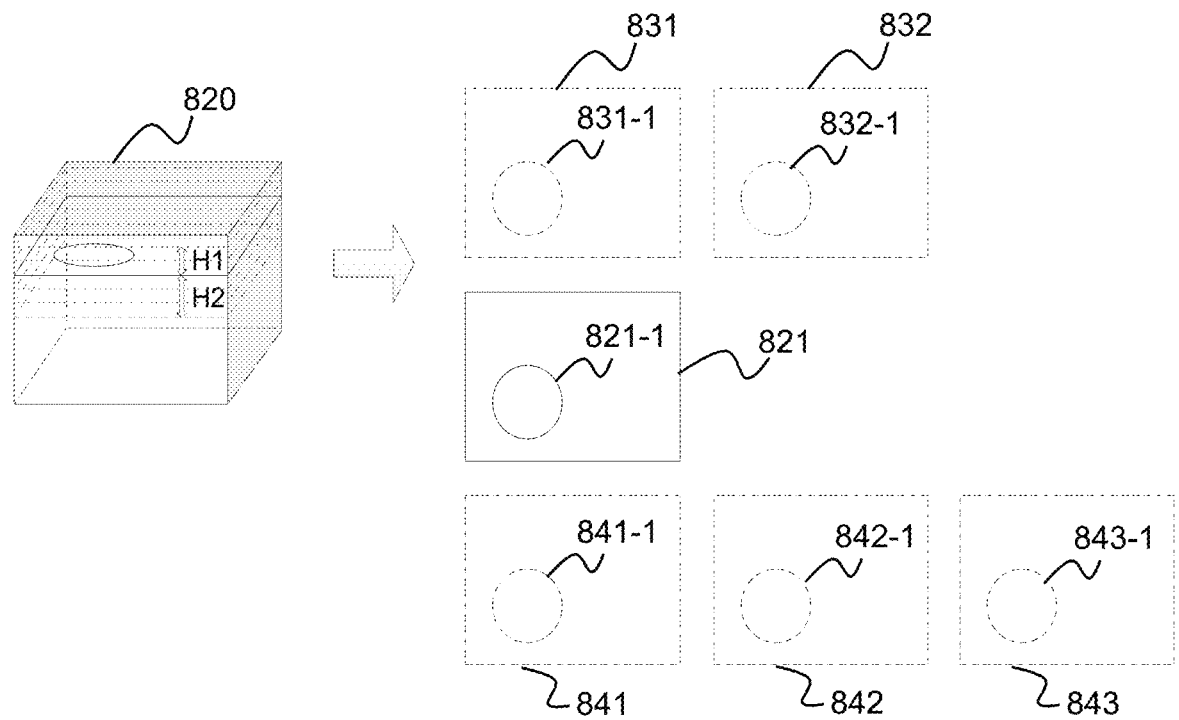
FIG. 8C is a schematic diagram illustrating an exemplary transmitted 2D ROI according to some embodiments of the present disclosure.

In 802, a first transmitting depth in a first transmitting direction of the first data layer may be obtained. In some embodiments, 802 may be implemented by the input/output module 340 of the processing device 120. The first transmitting direction may be the positive direction and/or the negative direction perpendicular to the first data layer. The first data layer may be located in an X-Y plane, an X-Z plane, a Y-Z plane, or a plane forming any inclined angle with any plane described above. In some embodiments, accordingly, the first transmitting direction may be the positive or negative direction of the Z axis, the positive or negative direction of the Y axis, the positive or negative direction of the X axis, or the positive or negative direction of a perpendicular axis of the plane in any inclined angle. In some embodiments, the first transmitting direction may be a direction forming any inclined angle with a plane of the first data layer. In some embodiments, the input/output module 340 may obtain a transmitting direction and/or a corresponding transmitting depth set by a user via the user interface 280. For example, a user may select a transmitting direction by clicking a certain side of a data layer 821 in a window displaying the volume data 820 on the user interface 280. As another example, a user may set a transmitting depth by inputting a corresponding value or dragging a numerical value slider. FIG. 8C is a schematic diagram illustrating an exemplary transmitted 2D ROI according to some embodiments of the present disclosure. In FIG. 8C, the first transmitting depth may be a transmitting depth H1 in the positive direction perpendicular to the data layer 821.

In 803, a second transmitting depth in a second transmitting direction of the first data layer may be obtained. In some embodiments, 803 may be implemented by the input/output module 340 of the processing device 120. The second transmitting direction may be the positive direction and/or the negative direction perpendicular to the first data layer. The second transmitting direction and the first transmitting direction may be opposite. In some embodiments, the second transmitting direction may be a direction forming any inclined angle with a plane of the first data layer. As shown in FIG. 8C, the second transmitting depth may be a transmitting depth H2 in the negative direction perpendicular to the data layer 821. In some embodiments, the input/output module 340 may obtain another transmitting direction and/or a corresponding transmitting depth set by a user via the user interface 280. The user may set the second transmitting depth in the second transmitting direction similarly to that in 802. In some embodiments, operations 802 and 803 may be combined into one operation. For example, the input/output module 340 may obtain two transmitting directions and/or two corresponding transmitting depths set by a user via the user interface 280. In some embodiments, only one of operations 802 and 803 may be selected and performed. For example, the input/output module 340 may obtain only one transmitting direction and/or one corresponding transmitting depth set by a user via the user interface 280.

In 804, one or more data layers of a set of volume data may be determined based on the first transmitting depth and/or the second transmitting depth. In some embodiments, 804 may be implemented by the analyzing unit 450 of the processing module 310. As shown in FIG. 8C, a set of volume data corresponding to the first transmitting depth H1 may include a data layer 831 and/or a data layer 832. A set of volume data corresponding to the second transmitting depth H2 may include a data layer 841, a data layer 842, and/or a data layer 843. In some embodiments, one or more data layers of a set of volume data corresponding to a transmitting depth may be determined based on a layer spacing in 804. In some embodiments, the layer spacing may be layer spacing of the volume data itself (i.e., unit layer spacing), and may relate to the image data scanned by the imaging device 110 or a slice thickness set by a user during scanning. In some embodiments, the layer spacing may be a layer spacing customized by the image processing system 100 or a user, for example, the layer spacing obtained by amplifying unit layer spacing by a factor (e.g., 1.5 times of the unit layer spacing, 2 times of the unit layer spacing, 3 times of the unit layer spacing). The factor may be any positive real number. In some embodiments, different sets of volume data may have different layer spacing. For example, a PET image may have a layer spacing of 1 to 10 mm, and a CT image may have a layer spacing of 0.1 to 20 mm or any other appropriate spacing. In some embodiments, the layer spacing of the same set of volume data in different axis directions or transmitting directions may be the same or different. For example, the layer spacing of the X axis and/or the Y axis may be 1.5 mm, while the layer spacing of the Z axis may be 5 mm. In some embodiments, the data layers may be different data layers in the same vertebra, or data layers in different cross sections of the same vessel.

In 805, a 2D coordinate location of the first 2D ROI in the first data layer may be determined. In some embodiments, 805 may be implemented by the analyzing unit 450 of the processing module 310. In some embodiments, the determined 2D coordinate location may be a 2D location of a reference voxel of the first 2D ROI in the first data layer. For example, the 2D coordinate location may include 2D coordinate information of the reference voxel of the first 2D ROI in a plane of the first data layer, for example, a Cartesian coordinate location (x, y). See, for example, a 2D coordinate location of the 2D ROI 821-1 in the data layer 821 shown in FIG. 8C. In some embodiments, the 2D coordinate location of the first 2D ROI may include 2D coordinate locations of all pixels/voxels of the pixel/voxel set of the first 2D ROI.

In some embodiments, the 2D location of the first 2D ROI may include 2D coordinate locations of boundary pixels/voxels of the first 2D ROI.

In 806, one or more fourth 2D ROIs may be generated in one or more data layers determined in 804 based on the 2D coordinate location determined in 805. In some embodiments, a fourth 2D ROI may include a set of one or more 2D ROIs. In some embodiments, 806 may be implemented by the transmitting unit 420 of the processing module 310. As shown in FIG. 8C, the fourth 2D ROI may include a 2D ROI 831-1 generated in the data layer 831, a 2D ROI 832-1 generated in the data layer 832, a 2D ROI 841-1 generated in the data layer 841, a 2D ROI 842-1 generated in the data layer 842, and/or a 2D ROI 843-1 generated in the data layer 843. In some embodiments, the fourth 2D ROI may have the same size and/or shape with the first 2D ROI. It should be noted that a fourth 2D ROI, each region of a plurality of fourth 2D ROIs, or a part of a region of the fourth 2D ROI may be separately extracted and/or analyzed by the image processing system 100 or a user.

It should be noted that the above descriptions of process 800 and the schematic diagrams of FIGS. 8B and 8C are provided for the purpose of illustration, and not intended to limit the scope of the present disclosure. Various variations and modifications may be conducted under the teaching of the present disclosure. However, those variations and modifications may not depart from the spirit and scope of this disclosure. For example, in some embodiments, a circular region of the transmitted 2D ROI shown in FIG. 8B or FIG. 8C may be replaced with a rectangular region, a rhombus region, and/or an irregular region, etc. As another example, the first 2D ROI in process 800 may be replace with a 3D VOI, that is, a 3D VOI may be transmitted between different data layers of the same volume data. The different data layers may refer to data layers in different ranges of a 3D space along any axis direction. In some embodiments, 805 may be performed before 802, 803, or 804. In some embodiments, operation 802 or operation 803 may be omitted.

Figure 9A:
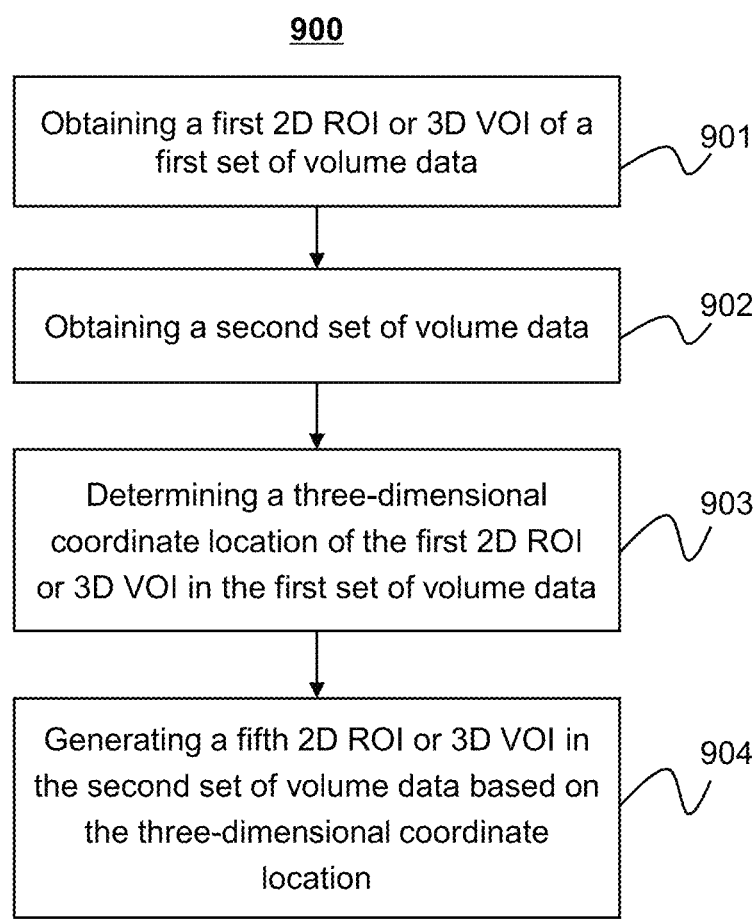
FIG. 9A is a flowchart illustrating an exemplary process for transmitting an anatomy of interest (2D ROI/3D VOI) according to some embodiments of the present disclosure.

FIG. 9A is a flowchart illustrating an exemplary process for transmitting an anatomy of interest (2D ROI/3D VOI) according to some embodiments of the present disclosure. In some embodiments, process 900 may be implemented by the transmitting unit 420 of the processing module 310. In some embodiments, operation 603 in process 600 may be performed according to process 900.

Figure 9B:
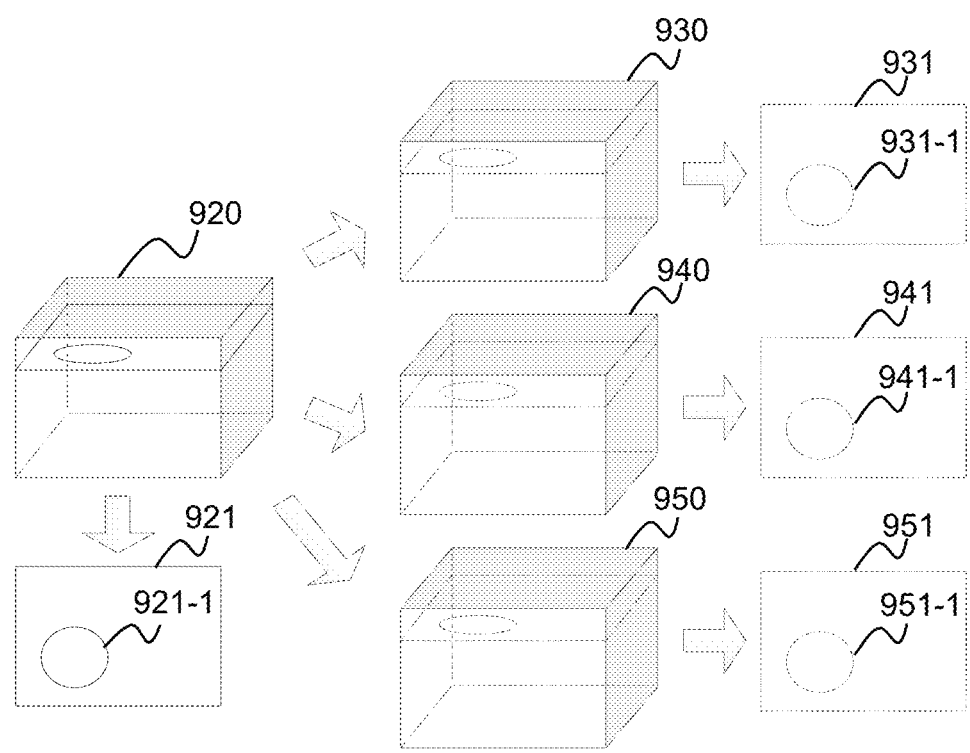
FIG. 9B is a schematic diagram illustrating the transmitting of a 2D ROI according to some embodiments of the present disclosure.

In 901, a first 2D ROI/3D VOI of a first set of volume data may be obtained. In some embodiments, 901 may be implemented by the input/output module 340 of the processing device 120. In some embodiments, data related to the first set of volume data and/or the first 2D ROI/3D VOI may be obtained from the storage module 330 in 901. In some embodiments, the user interface 280 may obtain the first 2D ROI/3D VOI selected and/or drawn in the first set of volume data by a user. FIG. 9B is a schematic diagram illustrating the transmitting of a 2D ROI according to some embodiments of the present disclosure. In FIG. 9B, a set of volume data 920 may include a data layer 921. The data layer 921 may include a first 2D ROI 921-1. In some embodiments, the volume data may include gating data, dynamic data, functional images, structure images, original images, and/or an analyzing result. It should be noted that the first 2D ROI/3D VOI obtained in 901 may be the same as or different from the first 2D ROI/3D VOI obtained in 701 shown in FIG. 7A, and/or the first 2D ROI obtained in 801 shown in FIG. 8A. In some embodiments, the first 2D ROI/3D VOI may be a 2D ROI/3D VOI, or a plurality of 2D ROIs/3D VOIs. The plurality of 2D ROIs/3D VOIs may be 2D ROIs/3D VOIs in the same data layer or in a plurality of different data layers. In some embodiments, the first set of volume data is only provided for the purpose of illustration, and is not intended to indicate that the volume data is obtained for the first time.

Figure 9C:
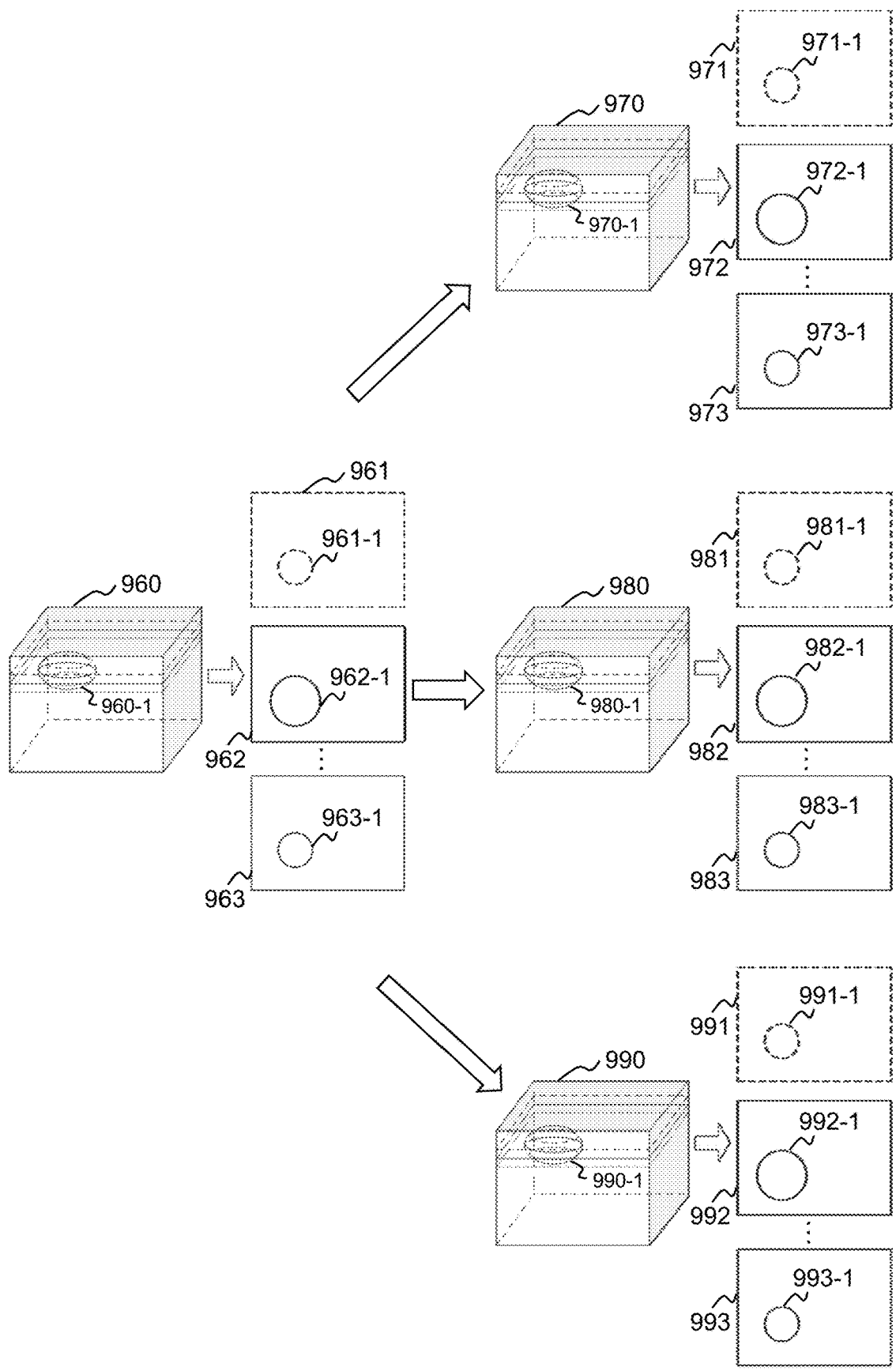
FIG. 9C is a schematic diagram illustrating the transmitting of a 3D VOI according to some embodiments of the present disclosure.

In some embodiments, a 3D VOI may be intersected with a plurality of data layers, and an outline of a 2D ROI may be formed in each of the plurality of data layers. FIG. 9C is a schematic diagram illustrating the transmitting of a 3D VOI according to some embodiments of the present disclosure. As shown in FIG. 9C, a data volume 960 may include a plurality of data layers, for example, a data layer 961, a data layer 962, and/or a data layer 963. The data volume 960 may include a 3D VOI 960-1. The 3D VOI 960-1 may intersect with the data layer 961, the data layer 962, and the data layer 963, and an outline of the 2D ROI 961-1 may be formed in the data layer 961, an outline of the 2D ROI 962-1 may be formed in the data layer 962, and an outline of the 2D ROI 963-1 may be formed in the data layer 963. The 2D ROI 961-1, the 2D ROI 962-1, and the 2D ROI 963-1 may have the same or different shapes or sizes. The 3D VOI 960-1 may have various 3D shapes, for example, a cube, a cuboid, a sphere, an ellipsoid, a cylinder, a cone, and/or a 3D geometry with any shape.

In 902, a second set of volume data may be obtained. In some embodiments, 902 may be implemented by the input/output module 340 of the processing device 120. In some embodiments, data related to the second set of volume data may be obtained from the storage module 330 in 902. In some embodiments, the second set of volume data may be used for comparative analysis with the first set of volume data, for example, a comparative analysis of gating data (first set of volume data) and dynamic data (second set of volume data) at different times, a comparative analysis of functional images (first set of volume data) and structural images (second set of volume data), a comparative analysis of original images (first set of volume data) and analyzing result (second set of volume data), etc. As shown in FIG. 9B, the second set of volume data may include volume data 930, volume data 940, and/or volume data 950. As shown in FIG. 9C, the second set of volume data may include volume data 970, volume data 980, and/or volume data 990. In some embodiments, the second set of volume data may have the same 3D shape and/or size with the first set of volume data. In some embodiments, the second set of volume data may have different 3D shapes and/or sizes with the first set of volume data. The number of pixels/voxels of the second set of volume data may be more than, less than or equal to the number of pixels/voxels of the first set of volume data. In some embodiments, the second set of volume data may have a shape and/or size larger than or equal to that of the first 2D ROI/3D VOI.

In 903, a 3D coordinate location of the first 2D ROI/3D VOI in the first set of volume data may be determined. In some embodiments, 903 may be implemented by the analyzing unit 450 of the processing module 310. For example, the 3D location information may include a 3D Cartesian coordinate location (x, y, z). In some embodiments, the 3D coordinate location of the first 2D ROI/3D VOI may include 3D coordinate locations of one or more pixels/voxels (e.g., a reference voxel) of the first 2D ROI/3D VOI. In some embodiments, the 3D coordinate locations of the first 2D ROI/3D VOI may include 3D coordinate locations of one or more pixels/voxels in a boundary of the first 2D ROI/3D VOI. As shown in FIG. 9B, a 3D coordinate location of the 2D ROI 921-1 in volume data 920 may be determined. As shown in FIG. 9C, a 3D coordinate location of the 3D VOI 960-1 in the volume data 960 may be determined. Further, if the 3D coordinate location of the 3D VOI 960-1 in the volume data 960 is determined, it means that a 3D coordinate location of a 2D ROI 961-1 in the data layer 961 is determined, a 3D coordinate location of a 2D ROI 962-1 in the data layer 962 is determined, and a 3D coordinate location of a 2D ROI 963-1 in the data layer 963 is determined.

In 904, one or more fifth 2D ROIs/3D VOIs may be generated in the second set of volume data based on the 3D coordinate location determined in 903. In some embodiments, a fifth 2D ROI/3D VOI may include one or more 2D ROIs/3D VOIs. In some embodiments, 904 may be implemented by the transmitting unit 420 of the processing module 310. In some embodiments, the fifth 2D ROI/3D VOI may have the same size and/or shape with the first 2D ROI/3D VOI. As shown in FIG. 9B, based on the 3D coordinate location of the 2D ROI 921-1 in the volume data 920, the generated fifth ROI may include a 2D ROI 931-1 generated in a data layer 931 of the volume data 930, a 2D ROI 941-1 generated in a data layer 941 of the volume data 940, and/or a 2D ROI 951-1 generated in a data layer 951 of the volume data 950. As shown in FIG. 9C, based on the 3D coordinate location of the 3D VOI 960-1 in the volume data 960, the fifth 3D VOI may include a 3D VOI 970-1 generated in the volume data 970, a 3D VOI 980-1 generated in the volume data 980, and/or a 3D VOI 990-1 generated in the volume data 990. The 3D VOI 970-1 may include a 2D ROI 971-1 in a data layer 971 of the volume data 970, a 2D ROI 972-1 in a data layer 972 of the volume data 970, and/or a 2D ROI 973-1 in a data layer 973 of the volume data 970. The 3D VOI 980-1 may include a 2D ROI 981-1 in a data layer 981 of the volume data 980, a 2D ROI 982-1 in a data layer 982 of the volume data 980, and/or a 2D ROI 983-1 in a data layer 983 of the volume data 980. The 3D VOI 990-1 may include a 2D ROI 991-1 in a data layer 991 of the volume data 990, a 2D ROI 992-1 in a data layer 992 of the volume data 990, and/or a 2D ROI 993-1 in a data layer 993 of the volume data 990. It should be noted that the fifth 2D ROI/3D VOI, each 2D region or 3D volume of a plurality of fifth 2D ROIs/3D VOIs, or a part of a 2D region or 3D volume of the fifth 2D ROI/3D VOI may be separately extracted and/or analyzed by the image processing system 100 or a user.

It should be noted that the above descriptions of process 900 and the schematic diagrams of FIGS. 9B and 9C are provided for the purpose of illustration, and not intended to limit the scope of the present disclosure. Various variations and modifications may be conducted under the teaching of the present disclosure. However, those variations and modifications may not depart from the spirit and scope of this disclosure. For example, in some embodiments, a circular region of the transmitted 2D ROI shown in FIG. 9B may be replaced with a rectangular region, a rhombus region, and/or an irregular region. As another example, in some embodiments, a rounded volume of the transmitted 3D VOI shown in FIG. 9C may be replace with an ellipsoid, a cube, a cuboid, a cylinder, a cone, and/or a volume with any shape. These variations are within the protective scope of the present disclosure.

Figure 10A:
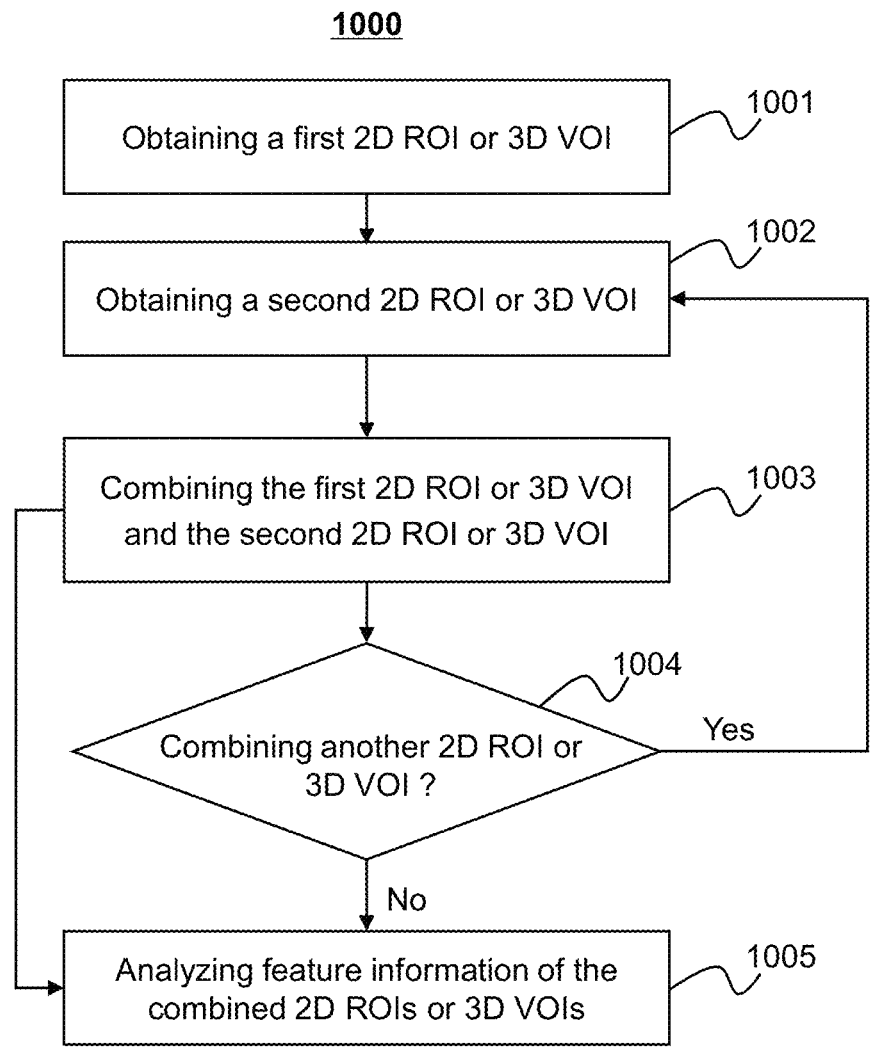
FIG. 10A is a flowchart illustrating an exemplary process for combining two or more anatomies of interest (2D ROI/3D VOI) according to some embodiments of the present disclosure.

FIG. 10A is a flowchart illustrating an exemplary process for combining two or more anatomies of interest (2D ROI/3D VOI) according to some embodiments of the present disclosure. In some embodiments, process 1000 may be performed by the combination unit 440 of the processing module 310. In some embodiments, operation 604 in process 600 may be performed according to process 1000.

Figure 10B:
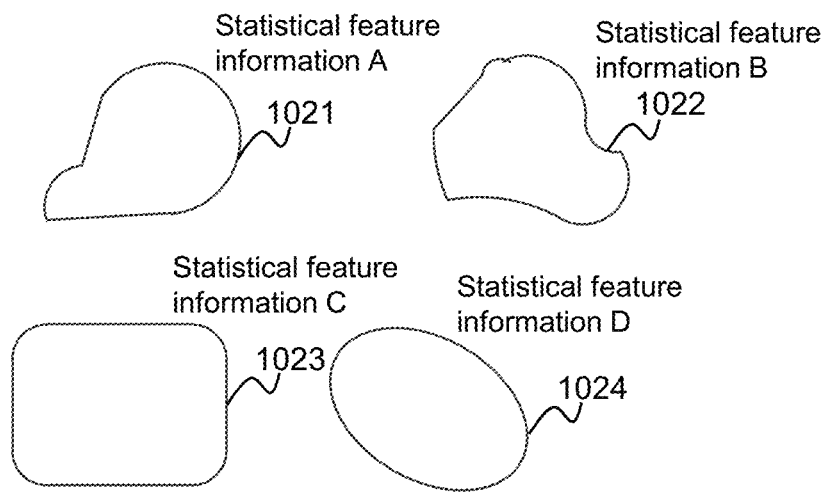
FIG. 10B is a schematic diagram illustrating exemplary anatomies of interest (2D ROIs/3D VOIs) according to some embodiments of the present disclosure.

In 1001, a first 2D ROI/3D VOI may be obtained. In some embodiments, 1001 may be implemented by the input/output module 340 of the processing device 120. In some embodiments, the data related to the first 2D ROI/3D VOI may be obtained from the storage module 330 in 1001. In some embodiments, the user interface 280 may obtain the first 2D ROI/3D VOI determined by a user. In some embodiments, the first 2D ROI/3D VOI may be a connected region. In some embodiments, the first 2D ROI/3D VOI may be a non-connected region. FIG. 10B is a schematic diagram illustrating exemplary anatomies of interest (2D ROIs/3D VOIs) according to some embodiments of the present disclosure. As shown in FIG. 10B, a 2D ROI/3D VOI 1021 may be obtained in 1001. The 2D ROI/3D VOI 1021 may include feature information, for example, the statistical feature information A.

In 1002, a second 2D ROI/3D VOI may be obtained. In some embodiments, 1002 may be implemented by the input/output module 340 of the processing device 120. In some embodiments, the data related to the second 2D ROI/3D VOI may be obtained from the storage module 330 in 1002. In some embodiments, the second 2D ROI/3D VOI and the first 2D ROI/3D VOI may be in the same data layer. In some embodiments, the second 2D ROI/3D VOI and the first 2D ROI/3D VOI may be in different data layers of the same volume data. In some embodiments, the second 2D ROI/3D VOI and the first 2D ROI/3D VOI may be in different sets of volume data. In some embodiments, the obtained second 2D ROI/3D VOI may be used for analysis with the first 2D ROI/3D VOI. In some embodiments, the second 2D ROI/3D VOI may relate to the first 2D ROI/3D VOI. For example, the first 2D ROI/3D VOI and the second 2D ROI/3D VOI may be discrete 2D regions or 3D volumes in biomedical images which need to be combined and collected, or may be connected regions or non-connected regions in biomedical images which need to be combined and collected. The connected regions or non-connected regions may be a spread tumor, and the location information of the tumor images may be discontinuous. As shown in FIG. 10B, a 2D ROI/3D VOI 1022, a 2D ROI/3D VOI 1023, and/or a 2D ROI/3D VOI 1024 may be obtained in 1002. The 2D ROI/3D VOI 1022 may include feature information, for example, statistical feature information B. The 2D ROI/3D VOI 1023 may include feature information, for example, the statistical feature information C. The 2D ROI/3D VOI 1024 may include feature information, for example, the statistical feature information D. In some embodiments, the 2D ROI/3D VOI 1022, the 2D ROI/3D VOI 1023, and/or the 2D ROI/3D VOI 1024 may be in the same data layer, different data layers of the same volume data, or different sets of volume data with the 2D ROI/3D VOI 1021.

Figure 10C:
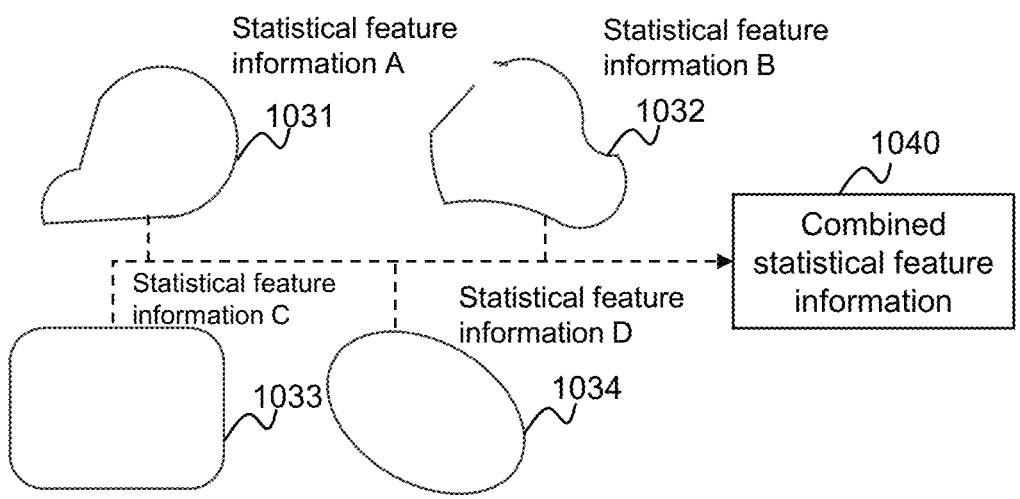
FIG. 10C is a schematic diagram illustrating exemplary combined anatomies of interest (2D ROIs/3D VOIs) according to some embodiments of the present disclosure.

In 1003, the first 2D ROI/3D VOI and the second 2D ROI/3D VOI may be combined. In some embodiments, 1001 may be implemented by the combination unit 440 of the processing module 310. The combination unit 440 may combine data of the first 2D ROI/3D VOI and data of the second 2D ROI/3D VOI. In some embodiments, a first set of pixels or voxels corresponding to the first 2D ROI/3D VOI may be determined, a second set of pixels or voxels corresponding to the second 2D ROI/3D VOI may be determined, and a union set of the first set of pixels or voxels and the second set of pixels or voxels may be designated as the combined 2D ROI/3D VOI. FIG. 10C is a schematic diagram illustrating exemplary combined anatomies of interest (2D ROIs/3D VOIs) according to some embodiments of the present disclosure. As shown in FIG. 10C, the 2D ROI/3D VOI 1031 and the 2D ROI/3D VOI 1032 may be combined in 1003.

In 1004, whether to combine another 2D ROI/3D VOI may be determined. In some embodiments, 1004 may be implemented by the analyzing unit 450 of the processing module 310. Operation 1004 may be performed based on one or more conditions. In some embodiments, the condition(s) may relate to the analysis demand of a user, that is, whether a user requires combination of more 2D ROIs/3D VOIs.

If it is determined that another 2D ROI/3D VOI is to be combined, process 1000 may return to 1002 to obtain another 2D ROI/3D VOI which needs to be combined. In some embodiments, as shown in FIG. 10C, a candidate 2D ROI/3D VOI which needs to be combined may be a 2D ROI/3D VOI 1033, and/or a 2D ROI/3D VOI 1034.

If it is determined that no 2D ROI/3D VOI is to be combined, process 1000 may proceed to 1005, and the feature information of the combined 2D ROIs/3D VOIs may be analyzed. In some embodiments, 1005 may be implemented by the analyzing unit 450 of the processing module 310. In some embodiments, operation 1004 may be skipped, and 1005 may be directly performed after 1003. In some embodiments, the feature information of a plurality of connected or non-connected regions which are combined may be analyzed in 1005. For example, overall feature information of a spread tumor with combined 2D ROIs/3D VOIs may be analyzed in 1005. The feature information may include statistical feature information. In some embodiments, as shown in FIG. 10C, the feature information of the combined 2D ROIs/3D VOIs may be combined statistical information 1040. In some embodiments, operations 1003 and 1005 may be performed simultaneously, for example, combined feature information may be directly analyzed after combining at least two 2D ROIs/3D VOIs.

It should be noted that the above descriptions of process 1000 and the schematic diagrams of FIGS. 10B and 10C are provided for the purpose of illustration, and not intended to limit the scope of the present disclosure. Various variations and modifications may be conducted under the teaching of the present disclosure. However, those variations and modifications may not depart from the spirit and scope of this disclosure. In some embodiments, the order of the operations of process 1000 may be interchanged. For example, operation 1004 may be first performed, and then operation 1003 may be performed. In some embodiments, a 2D ROI may be combined with another 2D ROI, a 2D ROI may be combined with a 3D VOI, and a 3D VOI may be combined with another 3D VOI. These variations are within the protective scope of the present disclosure.

It should be noted that the above description of image processing is provided for the purpose of illustration, and not intended to limit the scope of the present disclosure. It should be understood for those skilled in the art, various modifications and changes may be made on the present disclosure after understanding the principle of the present disclosure. Such modifications and changes are still within the scope of the present disclosure. It should be noted that one or more target anatomies of interest may be obtained by operations such as clipping, transmitting, and/or combining based on one or more initial anatomies of interest (2D ROIs/3D VOIs) of the volume data in the present disclosure. In some embodiments, operations such as clipping, transmitting, and/or combining may be further performed based on the target anatomies of interest.

In some embodiments, the initial anatomy of interest may be the 2D ROI/3D VOI drawn in operation 601, the 2D ROI/3D VOI clipped in operation 602, the 2D ROI/3D VOI transmitted in operation 603, the 2D ROIs/3D VOIs combined in operation 604, the first 2D ROI/3D VOI obtained in operation 701, the third 2D ROI/3D VOI obtained in operation 703, the first 2D ROI obtained in operation 801, the fourth 2D ROI generated in operation 806, the first 2D ROI/3D VOI obtained in operation 901, the fifth 2D ROI/3D VOI generated in operation 904, the 2D ROIs/3D VOIs combined in operation 1003, or any other anatomy of interest. Such variations are within the protective scope of the present disclosure.

In some embodiments, the initial anatomies of interest may be obtained by combining other anatomies of interest, and the other anatomies of interest may be referred to as candidate anatomies of interest to be combined (or deriving anatomies of interest). For example, if the combined 2D ROIs/3D VOIs in operation 1003 are initial anatomies of interest, the first 2D ROI obtained in operation 1001 and/or the second 2D ROI/3D VOI obtained in operation 1002 may be referred to as candidate anatomies of interest to be combined.

In some embodiments, the initial anatomies of interest may be obtained by transmitting other anatomies of interest, and the other anatomies of interest may be referred to as candidate anatomies of interest to be transmitted (or deriving anatomies of interest). For example, if the fourth 2D ROI generated in operation 806 is an initial anatomy of interest, the first 2D ROI obtained in operation 801 may be referred to as a candidate anatomy of interest to be transmitted. As another example, if the fifth 2D ROI/3D VOI generated in operation 904 is an initial anatomy of interest, the first 2D ROI/3D VOI obtained in operation 901 may be referred to as a candidate anatomy of interest to be transmitted.

In some embodiments, one or more anatomies of interest may be removed from the initial anatomy of interest or target anatomy of interest, and the one or more removed anatomies of interest may be referred to as candidate anatomies of interest to be clipped. The candidate anatomy of interest to be clipped may be the 2D ROI/3D VOI clipped in operation 602, the second 2D ROI/3D VOI clipped in operation 703, or any other anatomy of interest.

In some embodiments, the initial anatomy of interest or target anatomy of interest may be combined with one or more other anatomies of interest, and the other anatomies of interest used for combining may be referred to as candidate anatomies of interest to be combined. The candidate anatomies of interest to be combined may be the candidate 2D ROI/3D VOI to be combined in operation 604, the third 2D ROI/3D VOI obtained in operation 703, the fourth 2D ROI generated in operation 806, the fifth 2D ROI/3D VOI generated in operation 904, the 2D ROIs/3D VOIs combined in operation 1003, or any other anatomy of interest.

Described above are different aspects of a method for image processing and/or a method for implementing other operations through programs. Programs in technology may refer to "products" or "articles" existing in a form of executive code and/or related data, which are participated or implemented by computer readable media. Tangible and permanent storage media may include a memory or storage used by a computer, a processor, or similar devices or related modules. For example, semiconductor memories, tape drives, magnetic disk drives, or any other devices offering storage function for software.

All or part of the software may sometimes communicate over a network such as the Internet or other network of communication. Such communication may allow software to be loaded from one computer or processor to another, for example: to be loaded from a control server or host computer in an image processing system to a hardware platform under computer environment, or other computer environment implementing a system, or a system with similar functions of providing information needed for image processing. Therefore, another medium capable of transmitting software elements may be used as a physical connection between local devices, for example, light wave, electric wave, electromagnetic wave, etc., implementing transmission through cables, fiber optic cables, or air. Physical media for carriers such as cables, wireless connection, fiber optic cables or other similar devices may be referred to as media for carrying software. Here, all terms representing "readable media" of computers or machines may represent media participated during the processing of an instruction by a processor, unless a tangible storage medium is limited thereto.

Therefore, a computer readable medium may have multiple forms which include but are not limited to a tangible storage medium, a carrier medium, or a physical transmission medium. Stable store media may include: CD or disk, and other storage systems capable of implementing system components described in the figures used in other computers or similar devices. Unstable storage media may include a dynamic memory, for example, a main memory of a computer platform. Tangible transmission media may include coaxial cables, copper cables, and optic fibers, and include lines forming a bus within a computer system. A carrier transmission medium may transmit electric signals, electromagnetic signals, sound wave signals, or light wave signals, which may be produced by a method of radio frequency or infrared data communication. Usual computer readable media may include hard disks, diskettes, tapes, any other magnetic media; CD-ROMs, DVDs, DVD-ROMs, any other optic media, punched cards, any other physical storage media including an aperture mode; RAMs, PROMs, EPROMs, FLASH-EPROMs, any other memory chips or tapes; carriers transmitting data or instructions, cables, or connecting devices transmitting carriers, or any other program codes and/or data readable by a computer. Many of these computer readable media may occur in a process of the execution of instructions and transmission of a plurality of results by a processor.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of some patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters outlined in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values outlined in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method, implemented on at least one machine, each of which has at least one processor and storage for image processing, the method comprising:
    obtaining an image data set, wherein the image data set includes a first set of volume data including at least one data layer comprising at least one voxel and a second set of volume data different from the first set of volume data;

determining, by the at least one processor, a target anatomy of interest in the second set of volume data based on the first set of volume data, wherein determining the target anatomy of interest comprises:
  determining an initial anatomy of interest in the first set of volume data, and the initial anatomy of interest comprises at least one region of interest (ROI) or at least one volume of interest (VOI); and
  generating the target anatomy of interest in the second set of volume data by transmitting the initial anatomy of interest from the first set of volume data to the second set of volume data, wherein the target anatomy of interest and the initial anatomy of interest have a same shape, and wherein transmitting the initial anatomy of interest from the first set of volume data to the second set of volume data includes:
    determining location information of the initial anatomy of interest, the location information of the initial anatomy of interest including a three-dimensional coordinate location of a voxel of the initial anatomy of interest in the first set of volume data;
    obtaining at least one transmitting depth in at least one transmitting direction, wherein the at least one transmitting direction having at least one angle with respect to a plane of a first data layer of the first set of volume data;
    determining at least one second data layer of the second set of volume data based on the at least one transmitting depth; and
    generating the target anatomy of interest in the at least one second data layer based on the location information of the initial anatomy of interest.

2. The method of claim 1, further comprising editing the initial anatomy of interest, including:
  determining a first candidate anatomy of interest in the first set of volume data; and
  determining an updated initial anatomy of interest by removing an overlapping area of the first candidate anatomy of interest and the initial anatomy of interest from the initial anatomy of interest.

3. The method of claim 2, wherein determining an updated initial anatomy of interest comprises:
  removing an overlapping area of the first candidate anatomy of interest and the initial anatomy of interest from the initial anatomy of interest comprises:
  determining a first set of pixels or voxels corresponding to the initial anatomy of interest;
  determining a second set of pixels or voxels corresponding to the overlapping area of the first candidate anatomy of interest and the initial anatomy of interest; and
  designating a difference set between the first set of pixels or voxels and the second set of pixels or voxels as the updated initial anatomy of interest.

4. The method of claim 2, further comprising:
  determining a second candidate anatomy of interest n the first set of volume data; and
  obtaining an edited anatomy of interest by removing an overlapping area of the second candidate anatomy of interest and the updated initial anatomy of interest from the updated initial anatomy of interest.

5. The method of claim 1, wherein
the at least one transmitting depth includes a first transmitting depth and a second transmitting depth;
the at least one transmitting direction includes a first transmitting direction and a second transmitting direction;
the at least one angle includes a first angle and a second angle; and
wherein obtaining at least one transmitting depth in at least one transmitting direction comprises:
  obtaining the first transmitting depth in the first transmitting direction, wherein the first transmitting direction having the first angle with respect to the plane of the first data layer;
  obtaining the second transmitting depth in the second transmitting direction, wherein the second transmitting direction having the second angle with respect to the plane of the first data layer.

6. The method of claim 1, further comprising transmitting the target anatomy of interest to a third set of volume data different from the second set of volume data, including:
  obtaining the third set of volume data;
  determining location information of the target anatomy of interest, the location information of the target anatomy of interest including a three-dimensional coordinate location of a voxel of the target anatomy of interest in the second set of volume data; and
  generating a transmitted anatomy of interest in the third set of volume data based on the location information of the target anatomy of interest, wherein the transmitted anatomy of interest and the target anatomy of interest have a same shape.

7. The method of claim 1, further comprising editing the initial anatomy of interest, including:
  obtaining a candidate anatomy of interest in the first set of volume data; and
  combining the initial anatomy of interest and the candidate anatomy of interest to obtain an updated initial anatomy of interest.

8. The method of claim 7, wherein combining the initial anatomy of interest and the candidate anatomy of interest to obtain an updated initial anatomy of interest comprises:
  determining a first set of pixels or voxels corresponding to the initial anatomy of interest;
  determining a second set of pixels or voxels corresponding to the candidate anatomy of interest; and
  designating a union set of the first set of pixels or voxels and the second set of pixels or voxels as the updated initial anatomy of interest.

9. The method of claim 1, wherein the determining an initial anatomy of interest comprises:
  determining a deriving anatomy of interest in the first set of volume data;
  determining location information of the deriving anatomy of interest, the location information of the deriving anatomy of interest including a three-dimensional coordinate location of a voxel of the deriving anatomy of interest in the first set of volume data; and
  generating the initial anatomy of interest by transmitting the deriving anatomy of interest in the first set of volume data based on the location information of the deriving anatomy of interest, wherein the initial anatomy of interest and the deriving anatomy of interest have a same shape.

10. The method of claim 1, wherein determining an initial anatomy of interest comprises:
  obtaining a third set of volume data different from the first set of volume data;
  determining a deriving anatomy of interest in the third set of volume data;

determining location information of the deriving anatomy of interest, the location information of the deriving anatomy of interest including a three-dimensional coordinate location of a voxel of the deriving anatomy of interest in the third set of volume data; and generating the initial anatomy of interest by transmitting the deriving anatomy of interest to the first set of volume data based on the location information of the deriving anatomy of interest, wherein the initial anatomy of interest and the deriving anatomy of interest have a same shape.

11. The method of claim 1, further comprising analyzing the target anatomy of interest, wherein analyzing the target anatomy of interest comprises:

analyzing feature information associated with the target anatomy of interest, the feature information including statistical feature information obtained based on statistical analysis of a plurality of voxels in the target anatomy of interest.

12. A method implemented on at least one machine, each of which has at least one processor and storage for image processing, the method comprising:

obtaining an image data set, wherein the image data set includes a first set of volume data including at least one data layer comprising at least one voxel;

obtaining an initial anatomy of interest based on the first set of volume data, the initial anatomy of interest including at least one region of interest (ROI) or at least one volume of interest (VOI);

determining, by the at least one processor, a first location of the initial anatomy of interest in the first set of volume data; and generating a target anatomy of interest in the first set of volume data, by copying a shape of the initial anatomy of interest at a second location of the first set of volume data; or generating the target anatomy of interest in a second set of volume data, by transmitting the initial anatomy of interest to the second set of volume data, wherein the second location is different from the first location, and wherein transmitting the initial anatomy of interest to the second set of volume data includes:

obtaining at least one transmitting depth in at least one transmitting direction, wherein the at least one transmitting direction having at least one angle with respect to a plane of a first data layer of the first set of volume data;

determining at least one second data layer of the second set of volume data based on the at least one transmitting depth; and generating the target anatomy of interest in the at least one second data layer based on the first location of the initial anatomy of interest.

13. The method of claim 12, wherein obtaining the initial anatomy of interest based on the first set of volume data comprises:

determining at least two deriving anatomies of interest in the first set of volume data; and generating the initial anatomy of interest by combining the at least two deriving anatomies of interest.

14. A system comprising:

at least one processor; and a storage configured to store instructions, the instructions, when executed by the at least one processor, causing the system to effectuate a method comprising:

obtaining an image data set, wherein the image data set includes a first set of volume data including at least one data layer comprising at least one voxel and a second set of volume data different from the first set of volume data;

determining, by the at least one processor, a target anatomy of interest in the second set of volume data based on the first set of volume data, wherein determining the target anatomy of interest comprises:

determining an initial anatomy of interest in the first set of volume data, and the initial anatomy of interest comprises at least one region of interest (ROI) or at least one volume of interest (VOI); and generating the target anatomy of interest in the second set of volume data by transmitting the initial anatomy of interest from the first set of volume data to the second set of volume data, wherein the target anatomy of interest and the initial anatomy of interest have a same shape, and wherein transmitting the initial anatomy of interest from the first set of volume data to the second set of volume data includes:

determining location information of the initial anatomy of interest, the location information of the initial anatomy of interest including a three-dimensional coordinate location of a voxel of the initial anatomy of interest in the first set of volume data;

obtaining at least one transmitting depth in at least one transmitting direction, wherein the at least one transmitting direction having at least one angle with respect to a plane of a first data layer of the first set of volume data;

determining at least one second data layer of the second set of volume data based on the at least one transmitting depth; and generating the target anatomy of interest in the at least one second data layer based on the location information of the initial anatomy of interest.

15. The method of claim 11, further comprising:

analyzing feature information associated with the initial anatomy of interest, and comparing the feature information associated with the target anatomy of interest with the feature information associated with the initial anatomy of interest.

16. The method of claim 12, wherein the at least one transmitting depth includes a first transmitting depth and a second transmitting depth;

the at least one transmitting direction includes a first transmitting direction and a second transmitting direction;

the at least one angle includes a first angle and a second angle; and wherein obtaining at least one transmitting depth in at least one transmitting direction comprises:

obtaining the first transmitting depth in the first transmitting direction, wherein the first transmitting direction having the first angle with respect to the plane of the first data layer;

obtaining the second transmitting depth in the second transmitting direction, wherein the second transmitting direction having the second angle with respect to the plane of the first data layer.

17. The method of claim 12, further comprising:

obtaining a candidate anatomy of interest in the first set of volume data or in the second set of volume data; and combining the target anatomy of interest and the candidate anatomy of interest to obtain an updated target anatomy of interest.

18. The method of claim 12, further comprising:
determining a candidate anatomy of interest in the first set of volume data or in the second set of volume data; and
determining an updated target anatomy of interest by removing an overlapping area of the candidate anatomy of interest and the target anatomy of interest from the target anatomy of interest.

19. The method of claim 12, further comprising analyzing the target anatomy of interest, wherein analyzing the target anatomy of interest comprises:
analyzing feature information associated with the target anatomy of interest, the feature information including statistical feature information obtained based on statistical analysis of a plurality of voxels in the target anatomy of interest.

20. The method of claim 19, further comprising:
analyzing feature information associated with the initial anatomy of interest; and
comparing the feature information associated with the target anatomy of interest with the feature information associated with the initial anatomy of interest.

* * * * *